(12) United States Patent
Suzuki et al.

(10) Patent No.: US 9,245,168 B2
(45) Date of Patent: Jan. 26, 2016

(54) AUTHENTICATION APPARATUS, AUTHENTICATION PROGRAM, AND AUTHENTICATION METHOD

(71) Applicant: FUJITSU FRONTECH LIMITED, Inagi-shi, Tokyo (JP)

(72) Inventors: Tomoharu Suzuki, Inagi (JP); Takehiro Sekikawa, Inagi (JP); Maki Yabuki, Inagi (JP); Shinichi Eguchi, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 205 days.

(21) Appl. No.: 13/951,964

(22) Filed: Jul. 26, 2013

(65) Prior Publication Data

US 2013/0308834 A1    Nov. 21, 2013

Related U.S. Application Data

(63) Continuation of application No. PCT/JP2012/053395, filed on Feb. 14, 2012.

(30) Foreign Application Priority Data

Feb. 15, 2011    (WO) .................. PCT/JP2011/053187

(51) Int. Cl.
*G06K 9/00* (2006.01)
*G06K 9/03* (2006.01)
(Continued)

(52) U.S. Cl.
CPC ........ *G06K 9/00067* (2013.01); *G06K 9/00912* (2013.01); *G06K 9/036* (2013.01); *G06K 9/44* (2013.01); *G06K 9/4642* (2013.01)

(58) Field of Classification Search
CPC .............. G06K 9/0006; G06K 9/0013; G06K 2009/00932; G06K 9/40; G06K 9/44; G06K 9/60

See application file for complete search history.

(56) References Cited

U.S. PATENT DOCUMENTS

2003/0086592 A1 * 5/2003 Takiguchi et al. ............ 382/115
2008/0226136 A1   9/2008 Takaku et al.
(Continued)

FOREIGN PATENT DOCUMENTS

EP    1903509 A1    3/2008
JP    2000-268172 A   9/2000
(Continued)

OTHER PUBLICATIONS

Tasdizen, T., et al., "Non-Uniform Illumination Correction in Transmission Electron Microscopy", MICCAI Workshop on Microscopic Image Analysis with Application in Biology, Sep. 2008.
(Continued)

*Primary Examiner* — Edward Park
*Assistant Examiner* — Michael Vanchy, Jr.
(74) *Attorney, Agent, or Firm* — Westerman, Hattori, Daniels & Adrian, LLP

(57) ABSTRACT

An authentication apparatus performs identity authentication by comparing and matching image information of a palm captured by a sensor unit with a preliminarily registered template. A surface information correcting unit corrects concavity/convexity of a palm surface for surface information that allows the concavity/convexity thereof to be evaluated. The surface information is extracted by a surface information extraction unit from the image information obtained by capturing the palm. When the surface information is not corrected by the surface information correcting unit or not used for authentication by an authentication unit even after correction, the authentication apparatus newly obtains image information of the palm. Correction by the surface information correcting unit reduces opportunities for the authentication apparatus to perform notification to guide the palm to a proper posture.

10 Claims, 31 Drawing Sheets

(51) Int. Cl.
*G06K 9/44* (2006.01)
*G06K 9/46* (2006.01)

(56) References Cited

U.S. PATENT DOCUMENTS

| | | | |
|---|---|---|---|
| 2009/0036783 A1* | 2/2009 | Kishima | 600/476 |
| 2010/0127827 A1* | 5/2010 | Watanabe | 340/5.83 |
| 2012/0154566 A1* | 6/2012 | Kaku | 348/68 |

FOREIGN PATENT DOCUMENTS

| | | |
|---|---|---|
| JP | 2003-214823 A | 7/2003 |
| JP | 2005-353014 A | 12/2005 |
| JP | 2007-219625 A | 8/2007 |
| JP | 2008-071158 A | 3/2008 |
| JP | 2009-122729 A | 6/2009 |
| JP | 2009-211171 A | 9/2009 |
| JP | 2010-128822 A | 6/2010 |
| JP | 2010-218258 A | 9/2010 |

OTHER PUBLICATIONS

Miyazaki, K., et al., "Polarization-based Inverse Rendering from a Single View" in Proceedings of International Conference on Computer Vision, Oct. 2003, pp. 982-987, Nice, France.

Zhou, Y., et al., "Human Identification Using Palm-Vein Images", IEEE Transctions on Information Forensics and Security, Dec. 2011, vol. 6, No. 4, pp. 1259-1274.

International Search Report dated May 22, 2012, issued in corresponding application No. PCT/JP2012/053395.

* cited by examiner

61a ENTIRE PALM REGION

67a LUMINANCE DISTRIBUTION
67b LUMINANCE DISTRIBUTION
61b ENTIRE PALM REGION

67c LUMINANCE DISTRIBUTION
67d LUMINANCE DISTRIBUTION
61c ENTIRE PALM REGION

300 UNACCEPTED BIOMETRIC INFORMATION

| IDENTIFICA-TION NUMBER | DATE | TIME | USER ID | RETRY | UNACCEPTED LIVING BODY IMAGE | FAILURE REASON |
|---|---|---|---|---|---|---|
| 4 | 2011/1/1 | 8:00 | P0001 | 0 | IMG10004 | BENT TOO MUCH |
| 5 | 2011/1/1 | 8:01 | P0001 | 1 | IMG10005 | THUMB TOO LOW |
| 6 | 2011/1/1 | 8:02 | P0001 | 2 | IMG10006 | INCLINED RIGHTWARD TOO MUCH |
| | | | P0005 | | | |

310 UNACCEPTED ENVIRONMENT INFORMATION

| IDENTIFICA-TION NUMBER | DATE | TIME | USER ID | UNACCEPTED ENVIRONMENT IMAGE | SENSOR ID | ILLUMINATION | TEMPERATURE | HUMIDITY | PHYSICAL CONDITION |
|---|---|---|---|---|---|---|---|---|---|
| 4 | 2011/1/1 | 8:00 | P0001 | IMG20004 | 100 | ON | 21°C | 30% | GOOD |
| 5 | 2011/1/1 | 8:01 | P0001 | IMG20005 | 100 | ON | 21°C | 30% | GOOD |
| 6 | 2011/1/1 | 8:02 | P0001 | IMG20006 | 100 | ON | 21°C | 30% | GOOD |
| | 2011/1/1 | 8:03 | P0005 | IMG20007 | 100 | | 21°C | 30% | BAD |

78 PHOTOGRAPHING ENVIRONMENT IMAGE

80 FLUORESCENT LAMP
79 PHOTOGRAPHING ENVIRONMENT IMAGE

82 STRONG OUTSIDE LIGHT
81 PHOTOGRAPHING ENVIRONMENT IMAGE

84 UNKNOWN LIGHT
83 PHOTOGRAPHING ENVIRONMENT IMAGE

320 GUIDANCE INFORMATION

| IDENTIFICA-TION NUMBER | SITE 1 | | SITE 2 | | ... | OVERALL STATE | STATE MESSAGE | GUIDANCE MESSAGE | RETRY MESSAGE |
|---|---|---|---|---|---|---|---|---|---|
| | CONCAVE STATE | CONVEX STATE | CONCAVE STATE | CONVEX STATE | | | | | |
| 1 | — | — | — | — | ... | STATE 001 | SMSG001 | GMSG001 | RMSG001 |
| 2 | — | WEAK | — | — | ... | STATE 002 | SMSG002 | GMSG002 | RMSG002 |
| 3 | WEAK | — | — | — | ... | STATE 003 | SMSG003 | GMSG003 | RMSG003 |
| 4 | WEAK | WEAK | — | — | ... | STATE 004 | SMSG004 | GMSG004 | RMSG004 |

FIG. 24

350 PALM IMAGE

351 LUMINANCE MODEL

352 SURFACE-REFLECTED LIGHT

353 HIGH-FREQUENCY COMPONENT

354 SMOOTHED IMAGE

355 LUMINANCE CORRECTED IMAGE

AUTHENTICATION APPARATUS, AUTHENTICATION PROGRAM, AND AUTHENTICATION METHOD

CROSS-REFERENCE TO RELATED APPLICATION

This application is a continuation application of International Application PCT/JP2012/053395 filed on Feb. 14, 2012 which designated the U.S. and which claims priority to International Application PCT/JP2011/053187 filed on Feb. 15, 2011, the entire contents of which are incorporated herein by reference.

FIELD

The embodiments discussed herein relate to an authentication apparatus, an authentication program, and an authentication method configured to perform personal authentication using biometric information.

BACKGROUND

The human body includes biometric information that may identify an individual, some of which is used as information for identifying and authenticating an individual. For example, it is known that there are fingerprint, eye retina and iris, face, blood vessel, DNA (Deoxyribo Nucleic Acid) or the like, as biometric information available for authentication.

With the recent development of biometric authentication technology, a variety of apparatuses have been provided which recognize such characteristics of living body as a part of the human body, and perform personal authentication. Biometric authentication is performed by comparing the biometric information collected at the time of registration (registered template) with the biometric information obtained at the time of authentication.

In order to improve the precision of the authentication based on biometric information, it is desirable to obtain biometric information with a certain precision each time authentication is performed. However, the user to be authenticated does not always take a proper posture when authentication is being performed. Accordingly, there has been proposed a biometric authentication apparatus which guides biometric information to a proper position in order to obtain biometric information which may be compared with a registered template. For example, a biometric authentication apparatus using a vein of a palm detects displacement of the palm, and guides the palm to a position overlapping with the registered template (see Japanese Laid-open Patent Publication No. 2008-71158, for example).

However, guiding the living body to a proper posture frequently, or each time authentication is performed, may result in an evaluation by the user that the biometric authentication apparatus is not user-friendly. Particularly, around the boundary of whether guidance of the living body to a proper posture is needed or not, the user may have an experience such that, although the user recognizes that the living body is taking a proper posture, the living body is guided to a different proper posture from that of the user's recognition, or the living body is not guided to a proper posture although the user doubts if the living body is taking the proper posture. Such an experience makes it difficult for the user to recognize a truly proper posture. In addition, a biometric authentication apparatus providing such an experience is not convenient for a user, and thus it is desired to reduce the guidance frequency around the boundary of whether guidance of the living body to a proper posture is needed or not.

SUMMARY

According to an aspect of the embodiments to be discussed herein, there is provided an authentication apparatus which includes one or more processors configured to perform a procedure including: correcting surface information on a living body surface extracted from image information obtained by photographing a living body; and performing biometric authentication using the corrected surface information, wherein the correcting the surface information includes: generating a luminance model of the living body from a luminance distribution of the image information, extracting surface-reflected light of the living body from the luminance model, identifying high-frequency components included in the surface-reflected light and higher than a frequency component of biometric information used for the biometric authentication, and removing, from the image information, at least a part of the surface-reflected light and the high-frequency components to generate a smoothed image in which steep changes are smoothed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 illustrates an example of unaccepted biometric information of the second embodiment;

FIG. 21 illustrates an example of unaccepted environment information of the second embodiment;

FIG. 24 illustrates an exemplary guidance information database of the second embodiment;

DESCRIPTION OF EMBODIMENTS

Figure 1:
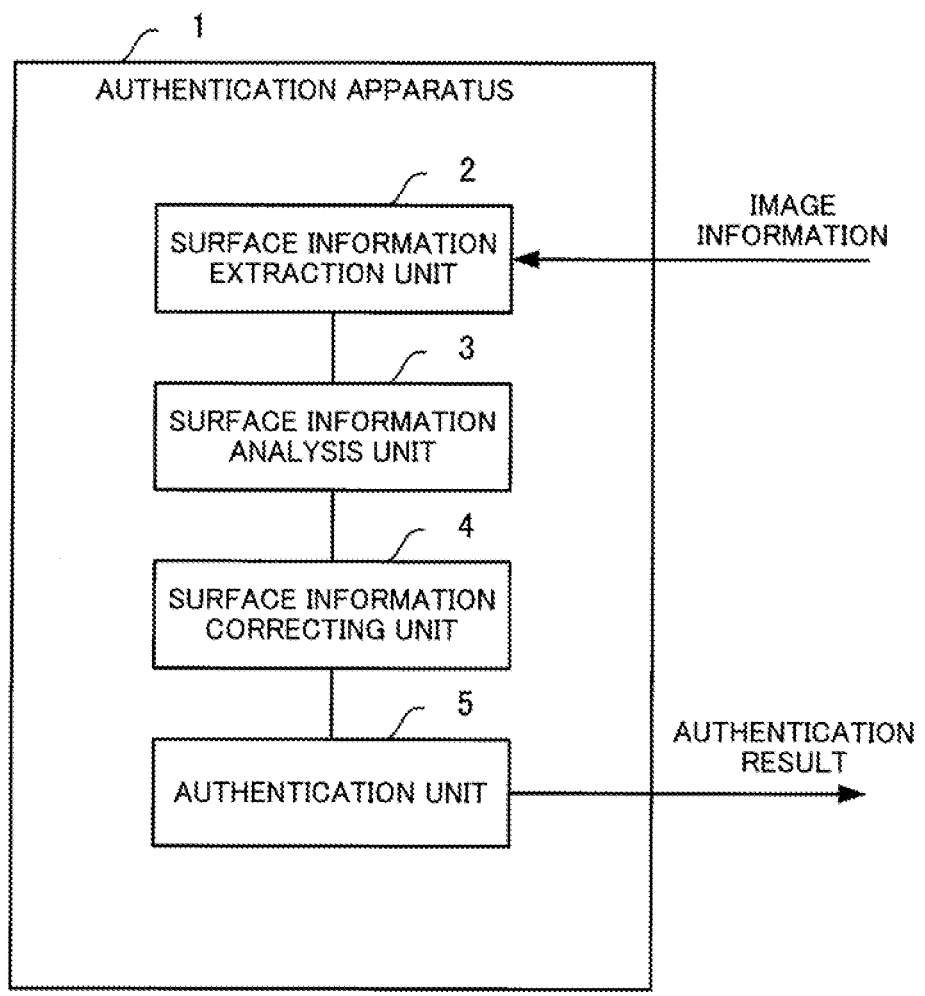
FIG. 1 illustrates a configuration of an authentication apparatus of a first embodiment.

In the following, embodiments will be described referring to the drawings.

First Embodiment

First, an authentication apparatus of a first embodiment will be described referring to FIG. 1. FIG. 1 illustrates a configuration of an authentication apparatus of the first embodiment.

An authentication apparatus 1 is an apparatus which uses a living body to perform identity authentication. The living body used by the authentication apparatus 1 for identity authentication is a vein of a palm. The authentication apparatus 1 performs identity authentication by comparing and matching the image information obtained by a sensor unit photographing the palm with a preliminarily registered template.

The sensor unit, including an image sensor, photographs a target living body, generates image information of the living body, and outputs it to the authentication apparatus 1. The image information, being image data of the living body (including, for example, location information and luminance information), is generated with a predetermined image format. The template is data preliminarily collected from the living body to be used for matching of the living body.

The authentication apparatus 1 includes a surface information extraction unit 2, a surface information analysis unit 3, a surface information correcting unit 4, and an authentication unit 5. The surface information extraction unit 2 extracts, from the image information obtained by photographing the palm (living body), surface information that is used for evaluating concavity/convexity of the palm surface (living body surface). The surface information is information that allows the concavity/convexity of the living body surface to be evaluated, luminance information, for example. The surface information analysis unit 3 analyzes, from the surface information, concavity/convexity of the palm surface.

The surface information correcting unit 4 corrects the concavity/convexity of the palm surface for the surface information. For example, the surface information correcting unit 4 performs correction to smooth the concavity/convexity of the palm surface for the surface information. The authentication unit 5 performs biometric authentication using the corrected surface information.

When the surface information correcting unit 4 is not able to perform correction, or when the result of correction is not able to be used for authentication by the authentication unit 5, the authentication apparatus 1 newly obtains image information of the palm. In this occasion, the authentication apparatus 1 performs notification to guide the palm to a proper posture in order to obtain image information in which the palm takes a proper posture. The authenticate (user) receives the notification and adjusts the posture of the palm.

Accordingly, through the correction performed by the surface information correcting unit 4, there will be an increase in opportunity to perform biometric authentication using the surface information corrected by the authentication unit 5, otherwise there will be a decrease in opportunity for the authentication apparatus 1 to perform notification to guide the authenticate's palm to a proper posture. Particularly, the authentication apparatus 1 is capable of reducing the guidance frequency around the boundary of whether guidance of the living body to a proper posture is needed or not.

Generally, biometric information to be used in biometric authentication is obtained from a living body and thus unstable due to the influence of biological activities of the living body. In other words, biometric information is not always constant but may vary within a certain range. Specifically, biometric information is influenced by breathing of the living body, strain or relaxation of muscles, expansion or relaxation of blood vessels, or the like. Although the authenticate tries to stay still, the biometric information is influenced by biological activities described above, and involuntarily exhibits a slight variation.

In addition, the biometric information is influenced not only by biological activities, but also by environmental changes when obtaining biometric information. The environment when obtaining biometric information varies each time and thus it is not constant. For example, environmental light when obtaining biometric information varies depending on the weather or time zone under influence of outdoor light, and also varies indoor depending on the cycle of turning on the room light such as fluorescent lamps or movement of people around.

Biometric information is sometimes considered unsuitable for use in authentication due to such a slight variation of biometric information or environmental changes. The authentication apparatus 1 reduces such instability of biometric information or influence of environmental changes by correcting biometric information. The authentication apparatus 1 then reduces the opportunity of performing notification that guides the living body to a proper posture.

Next, a more specific description will be provided using a second embodiment.

Second Embodiment

Figure 2:
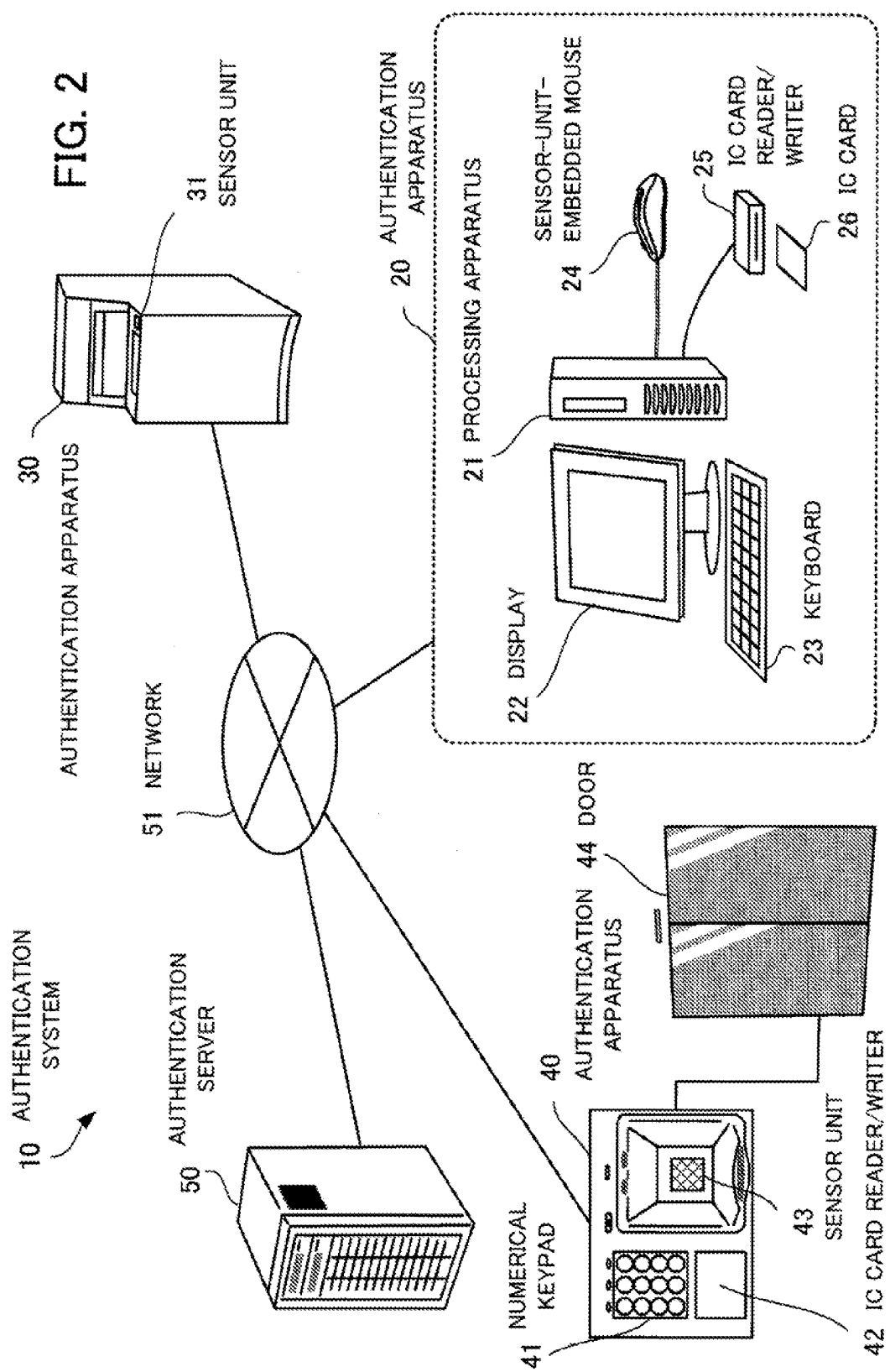
FIG. 2 illustrates a configuration of an authentication system of a second embodiment.

FIG. 2 illustrates a configuration of an authentication system of the second embodiment. Although a system is illustrated as the second embodiment in which an authentication system 10 performs authentication using a vein of a palm, it is not limited thereto and is also applicable to a system that performs authentication using other characteristic detection sites of the living body.

The authentication system 10 is a system that recognizes characteristics of living body to identify and authenticate an individual, which is available when logging on the information system or performing entrance and exit management. The authentication system 10 is configured to include an authentication apparatus 20, an authentication apparatus 30, an authentication apparatus 40, an authentication server 50, and a network 51.

The authentication apparatus 20, the authentication apparatus 30, and the authentication apparatus 40 are apparatuses that perform biometric authentication when authenticating a user. The authentication apparatus 20, which is a computer that performs user authentication, is a business-use terminal requiring a high security level, for example. The authentication apparatus 30 is an ATM (Automated Teller Machine) installed in a financial institution. The authentication apparatus 40 is an entrance and exit management apparatus for a security area.

The authentication server 50 stores identification information for identifying a user in association with biometric information (template) which is preliminarily registered prior to biometric authentication. The identification information for identifying a user is a unique ID (IDentification) provided directly (e.g., user number) or indirectly (e.g., account number) to the user. The biometric information to be preliminarily registered includes characteristic information of a characteristic part extracted from the image information, encoded information of the image information or characteristic information, or the like.

In addition, the authentication server 50 is a database server of the authentication system 10, provided with various databases (e.g., an unaccepted biometric information database, an unaccepted environment information database, and a guidance information database described below). The network 51 connects the authentication apparatus 20, the authentication apparatus 30, the authentication apparatus 40, and the authentication server 50 communicably in a wired or wireless manner. Various databases may be provided in the authentication apparatus 20, the authentication apparatus 30, and the authentication apparatus 40, in place of the authentication server 50.

The authentication apparatus 20 is configured to include a processing apparatus 21, a display 22, and a sensor-unit-embedded mouse 24, and also configured to include a keyboard 23, an IC (Integrated Circuit) card reader/writer 25, etc. as needed. The sensor-unit-embedded mouse 24 has a sensor unit built therein. The sensor unit, having an image capturing device, photographs the user's palm, and outputs the captured image to the processing apparatus 21. The IC card reader/writer 25 reads or writes information of an IC card 26 of the user. The keyboard 23 and the sensor-unit-embedded mouse 24 accept input operations.

Here, palm vein authentication in the authentication apparatus 20 is described. A user requesting authentication inputs identification information for identifying the user (e.g., user ID) via the keyboard 23, the sensor-unit-embedded mouse 24, or the IC card reader/writer 25. The authentication apparatus 20 prompts the user to input biometric information by presentation using the display 22. The user inputs biometric information by holding the palm above the sensor-unit-embedded mouse 24. Upon receiving the input of a palm vein image as biometric information, the authentication apparatus 20 performs matching of the input vein image (biometric information) with a registered template. The registered template may be stored in a storage unit of the processing apparatus 21, a storage unit of the authentication server 50, or a storage unit of the IC card 26 of the user.

The authentication apparatus 30 has a sensor unit 31. The sensor unit 31, having an image capturing device, photographs the user's palm. The authentication apparatus 30 performs authentication of the user using the captured image. The authentication apparatus 30, having an IC card reader/writer (not illustrated), performs matching using a registered template stored in an IC card (e.g., an IC-chip-built-in cash card).

The authentication apparatus 40 has a numerical keypad 41, an IC card reader/writer 42, and a sensor unit 43. The numerical keypad 41 is used for inputting a password when password-based authentication is used together. The IC card reader/writer 42 reads or writes information of the user's IC card (not illustrated). The sensor unit 43, having an image capturing device, photographs the user's palm. The authentication apparatus 40 performs authentication of the user based on the registered template stored in the IC card and the captured image, and controls opening and closing of a door 44.

Figure 3:
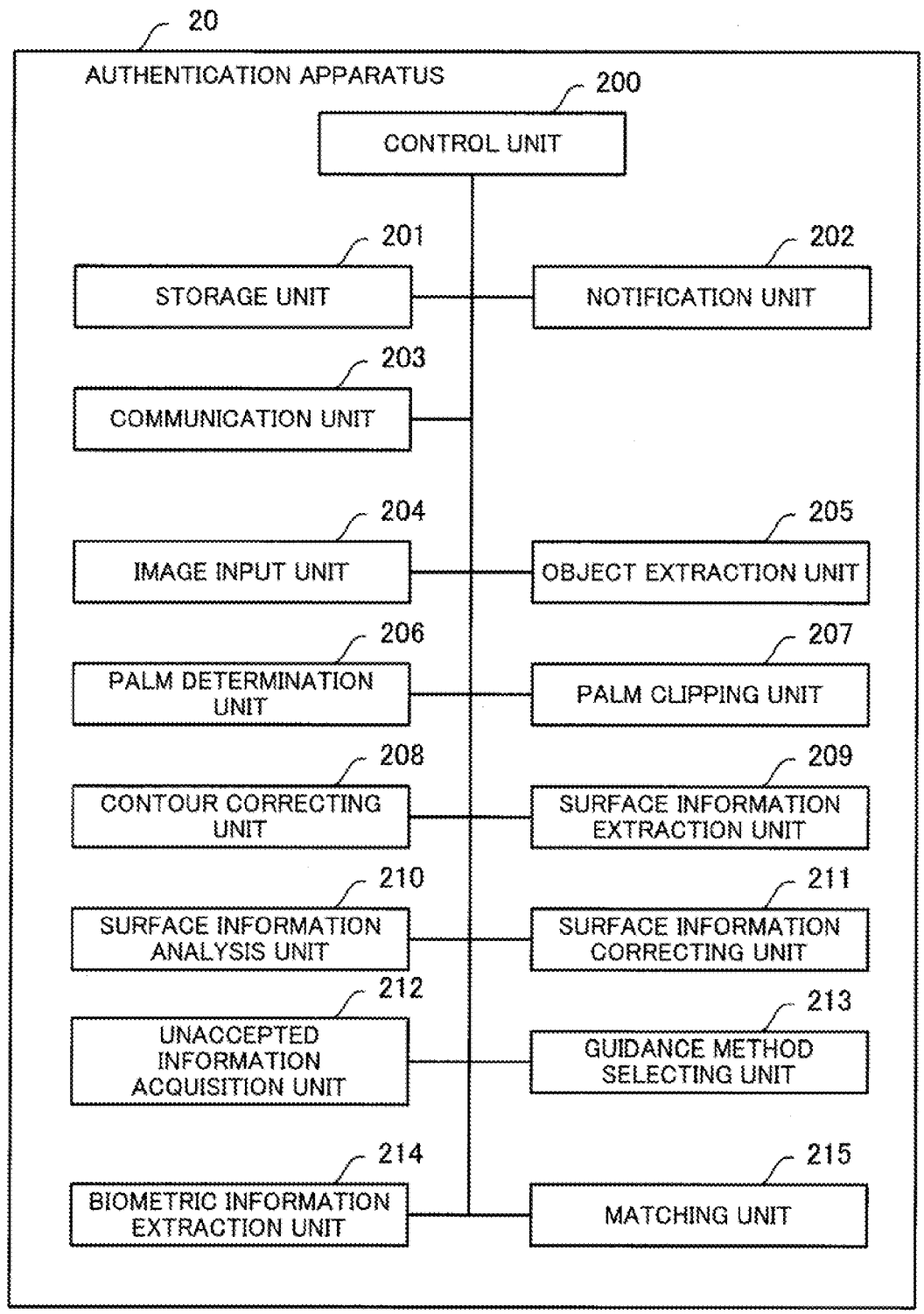
FIG. 3 illustrates a configuration of an authentication apparatus of the second embodiment.

Next, a configuration which realizes a procedure for the authentication apparatus 20 to perform palm vein authentication will be described referring to FIG. 3. FIG. 3 illustrates a configuration of an authentication apparatus of the second embodiment.

The authentication apparatus 20 has a control unit 200, a storage unit 201, a notification unit 202, and a communication unit 203. Furthermore, the authentication apparatus 20 has an image input unit 204, an object extraction unit 205, a palm determination unit 206, a palm clipping unit 207, a contour correcting unit 208, and a surface information extraction unit 209. Furthermore, the authentication apparatus 20 has a surface information analysis unit 210, a surface information correcting unit 211, an unaccepted information acquisition unit 212, a guidance method selecting unit 213, a biometric information extraction unit 214, and a matching unit 215.

The control unit 200 totally controls respective processing units to perform user authentication. The storage unit 201 stores and retains image information obtained from the sensor-unit-embedded mouse 24, various databases, and the like. The notification unit 202 generates and displays on the display 22 desired messages for the user such as guidance about the manner of holding the palm above the sensor-unit-embedded mouse 24, notification of success or failure of the matching, or the like. In addition, the notification unit 202 generates and outputs from a loud speaker (not illustrated), desired audio messages for the user such as guidance about the manner of holding the palm above the sensor-unit-embedded mouse 24 or notification of success or failure of the matching, or the like. The communication unit 203 communicates with a sensor unit embedded in the sensor-unit-embedded mouse 24, an IC chip built in the IC card reader/writer 25, and a computer connected to the network 51.

The image input unit 204 inputs the captured image of the living body from the sensor-unit-embedded mouse 24. The object extraction unit 205 removes the background from the captured image and extracts the object. The palm determination unit 206 determines whether or not the object is a palm. When the palm determination unit 206 determines that the object is not a palm, the image input unit 204 newly inputs a captured image of the living body from the sensor-unit-embedded mouse 24. In this occasion, the notification unit 202 may be configured to guide the motion of holding the palm above.

From the object determined to be a palm by the palm determination unit 206, the palm clipping unit 207 clips the palm (the fingers and the wrist may be included). The contour correcting unit 208 corrects the position (backward and forward, rightward and leftward positional correction), the size (upward and downward height correction), and orientation (rotational correction) of the clipped palm to the correct position.

The surface information extraction unit 209 extracts surface information from the palm image corrected by the contour correcting unit 208. Specifically, the surface information extraction unit 209 extracts, as surface information, luminance (luminance information) from the palm image. The surface information extraction unit 209 extracts, as surface information, not only luminance but also lightness or the like from the palm image. In addition, the surface information extraction unit 209 may obtain distance information from the sensor-unit-embedded mouse 24 as information associated with the palm image, and may obtain the distance between a distance measuring sensor and the palm surface as surface information.

The surface information analysis unit 210 analyzes concave/convex sites of the palm from the surface information extracted by the surface information extraction unit 209. The surface information correcting unit 211 corrects, among the concave/convex sites analyzed by the surface information analysis unit 210, a concave/convex site within a correctable range. The surface information analysis unit 210 obtains a palm image having the concave/convex site corrected, a palm image for which correction with regard to the concave/convex site is not desired. When the surface information correcting unit 211 determines that the concave/convex site is not within a correctable range, the image input unit 204 newly inputs the captured image of the living body from the sensor-unit-embedded mouse 24. In this occasion, the notification unit 202 may be configured to guide the motion of holding the palm above.

The biometric information extraction unit 214 extracts biometric information to be used for matching from the palm image obtained by the surface information analysis unit 210. Specifically, the biometric information extraction unit 214 extracts a vein pattern in the palm image, or information for matching included in the vein pattern. The information for matching includes, for example, characteristics points (edge point or branch point of a vein) included in the vein pattern, the number of veins crossing with a straight line binding a characteristics point and a proximate characteristic point, and a small image centered on a characteristics point. The matching unit 215 compares and performs matching of the biometric information (information for matching) extracted by the biometric information extraction unit 214 with a registered template which has been preliminarily registered.

In this manner, the authentication apparatus 20 rectifies the slight variation of biometric information and environmental changes by correcting concave/convex sites. The authentication apparatus 20 reduces the opportunities to perform notification that guides the living body to a proper posture, by reducing instability of the biometric information and influence of environmental changes.

The authentication apparatus 20 has a function of performing a procedure for providing a more appropriate guidance when the surface information correcting unit 211 determines that the concave/convex site is not within a correctable range. The unaccepted information acquisition unit 212 registers the captured image which was unusable for matching in an unaccepted biometric information database as an unaccepted image. In addition, the unaccepted information acquisition unit 212 registers the environment information at the time of capturing the image which was unusable for matching in the unaccepted environment information database.

The guidance method selecting unit 213 selects, referring to a guidance information database, a guidance method corresponding to the captured image which was unusable for matching. The guidance method selected by the guidance method selecting unit 213 is notified to the user by the notification unit 202.

In this manner, when the captured image is unusable for matching, the authentication apparatus 20 is able to present and notify to the user an appropriate guidance method. In addition, accumulation of causes of failure in the unaccepted biometric information database and the unaccepted environment information database contributes to enhancement of the guidance method selected by the guidance method selecting unit 213.

Figure 4:
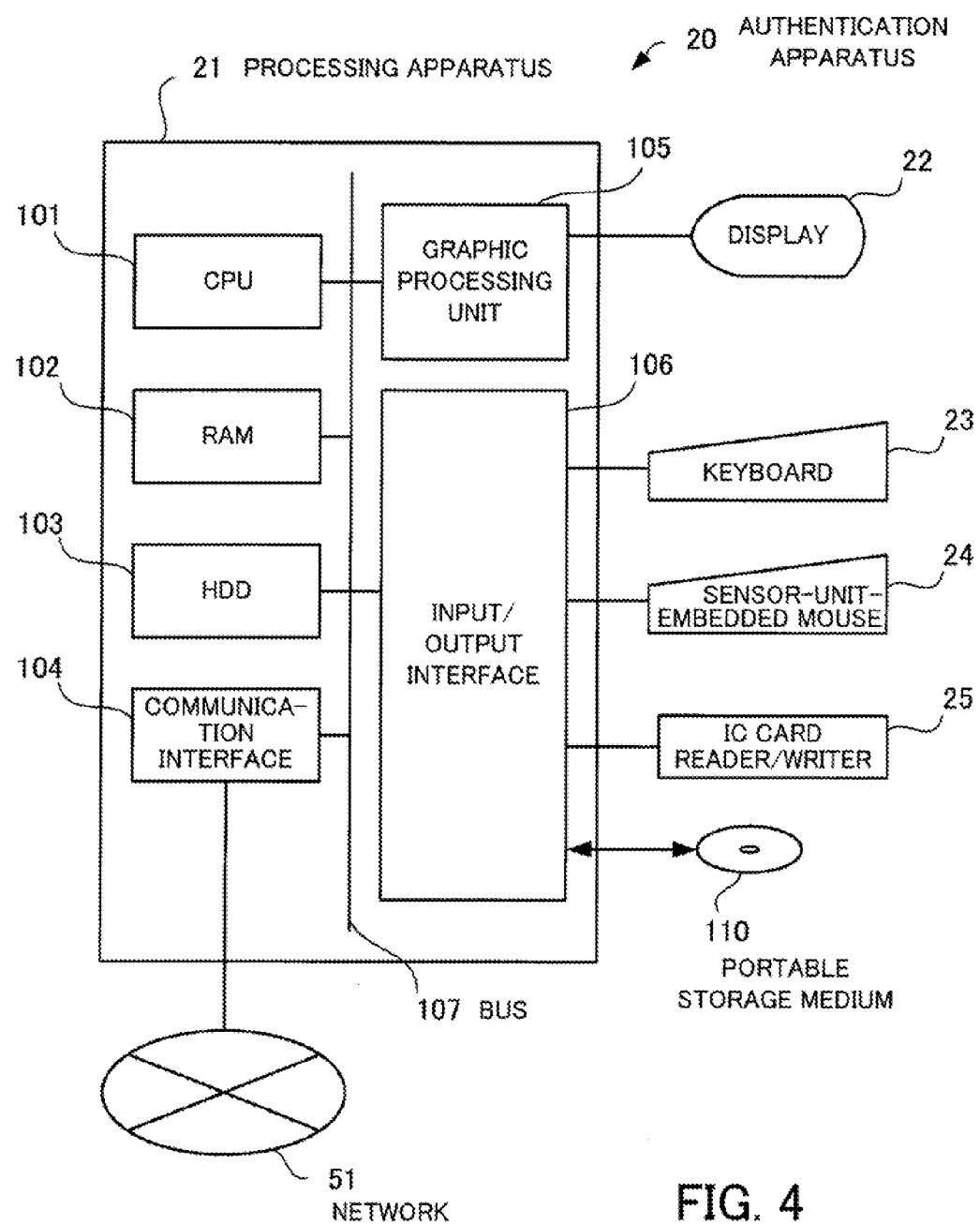
FIG. 4 illustrates an exemplary hardware configuration of the authentication apparatus of the second embodiment.

Next, an exemplary hardware configuration of the authentication apparatus 20 of the embodiment will be described referring to FIG. 4. FIG. 4 illustrates an exemplary hardware configuration of the authentication apparatus of the second embodiment.

The authentication apparatus 20 includes the processing apparatus 21, the display 22, the keyboard 23, the sensor-unit-embedded mouse 24, and the IC card reader/writer 25.

The entirety of the processing apparatus 21 is controlled by a CPU (Central Processing Unit) 101. The CPU 101 has a RAM (Random Access Memory) 102, an HDD (Hard Disk Drive) 103, a communication interface 104, a graphic processing unit 105, and an input-output interface 106 connected thereto via a bus 107.

The RAM 102 has programs of the OS (Operating System) executed by the CPU 101 and at least a part of application programs temporarily stored therein. In addition, the RAM 102 has stored therein various data needed for processing by the CPU 101. The HDD 103 has the OS and application programs stored therein.

The graphic processing unit 105 has a display 22 connected thereto. The graphic processing unit 105 causes an image to be displayed on the screen of the display 22, according to an instruction from the CPU 101.

The input-output interface 106 has the keyboard 23, the sensor-unit-embedded mouse 24, and the IC card reader/writer 25 connected thereto. In addition, the input-output interface 106 allows connection thereto of a portable storage medium interface which allows writing of information to a portable storage medium 110 and reading of information from the portable storage medium 110. The input-output interface 106 transmits, to the CPU 101 via the bus 107, the signal being transmitted from the keyboard 23, the sensor-unit-embedded mouse 24, the IC card reader/writer 25, and the portable storage medium interface.

More specifically, the input-output interface 106 may be connected to the sensor-unit-embedded mouse 24 via a USB (Universal Serial Bus). Since the processing apparatus 21 receives the captured image from the sensor unit, USB connection is desirable to be based on USB 2.0 or later which is connectable in a high speed mode.

The communication interface 104 is connected to the network 51. The communication interface 104 transmits and receives data to and from the authentication server 50.

The processing function of the present embodiment may be realized by a hardware configuration as described above. The authentication apparatus 30, the authentication apparatus 40, and the authentication server 50 may be realized by a similar hardware configuration.

The processing apparatus 21 may be configured to include modules respectively including an FPGA (Field Programmable Gate Array), a DSP (Digital Signal Processor), or the like, or may be configured not to include the CPU 101. In such a case, the processing apparatus 21 has a nonvolatile memory (e.g., EEPROM (Electrically Erasable and Programmable Read Only Memory), a flash memory, a flash memory type memory card) respectively, and stores the firmware of the modules. Into the nonvolatile memory, the firmware may be written via the portable storage medium 110 or the communication interface 104. Thus the processing apparatus 21 may also update the firmware by rewriting the firmware stored in the nonvolatile memory.

Figure 5:
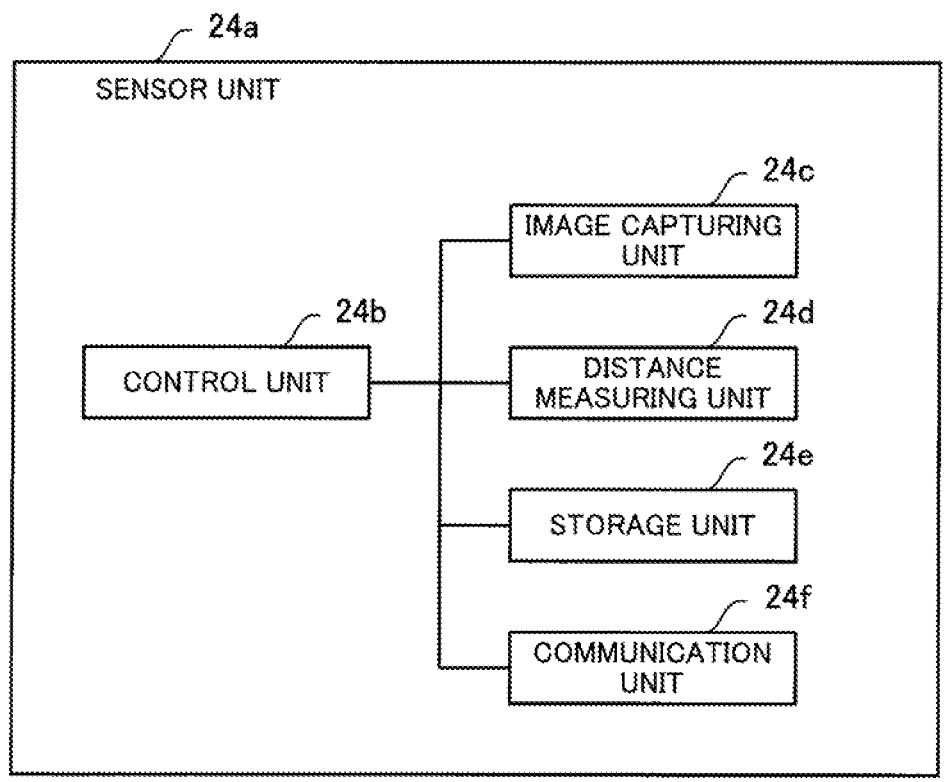
FIG. 5 illustrates a configuration of a sensor unit of the second embodiment.

Next, a configuration in which the sensor-unit-embedded mouse 24 obtains image information and distance information and outputs the information to the processing apparatus 21 will be described referring to FIG. 5. FIG. 5 illustrates the configuration of the sensor unit of the second embodiment. The sensor unit 31 and the sensor unit 43 may have a configuration similar to a sensor unit 24a.

The sensor unit 24a is embedded in the sensor-unit-embedded mouse 24. The sensor unit 24a includes a control unit 24b, an image capturing unit 24c, a distance measuring unit 24d, a storage unit 24e, and a communication unit 24f.

The control unit 24b totally controls respective processing units. The image capturing unit 24c obtains image information from a target living body. The image capturing unit 24c includes an image sensor (e.g., CMOS (Complementary Metal Oxide Semiconductor) sensor, CCD (Charge Coupled Device) sensor, etc.) which photographs the living body, a condensing lens, and a plurality of near-infrared light-emitting elements (LED: Light Emitting Diodes) which irradiate the object. The near-infrared light-emitting elements, provided on the periphery of the image sensor for example, emits near infrared light toward the object (upward), and the image sensor photographs the object irradiated by the near infrared light. The image sensor may capture the object palm within a wide photographing range, through the condensing lens (wide-angle lens) in a wide area.

The distance measuring unit 24d obtains information of the distance to the target living body. The sensor unit 24a is able to measure the photographing timing with the distance measuring sensor to photograph the palm within a predetermined range of distance. The image capturing unit 24c may perform continuous photographing (e.g., 15 frames per second) at a predetermined timing and use one or more of the captured images for matching.

The storage unit 24e stores the distance information obtained by the distance measuring unit 24d and the image information obtained by the image capturing unit 24c in association with the image information. The communication unit 24f, connected to the communication unit 203 of the processing apparatus 21, receives instructions from the processing apparatus 21, and transmits image information and distance information.

The image captured by the sensor unit 24a is an image obtained by irradiating near infrared light on the target living body (palm) and photographing the reflected light. Since hemoglobin in red blood cells flowing through the vein has a reduced amount of oxygen, such hemoglobin (reduced hemoglobin) has a property of absorbing near infrared light around 700 to 1000 nanometers. Therefore, holding the palm against the near infrared light results in less reflection in the part where the vein exists, and thus the location of the vein becomes recognizable according to the strength/weakness of the reflected near infrared light. Although extraction of characteristic information of the captured image becomes easy by the use of a particular light source, the image is achromatic.

Figure 6:
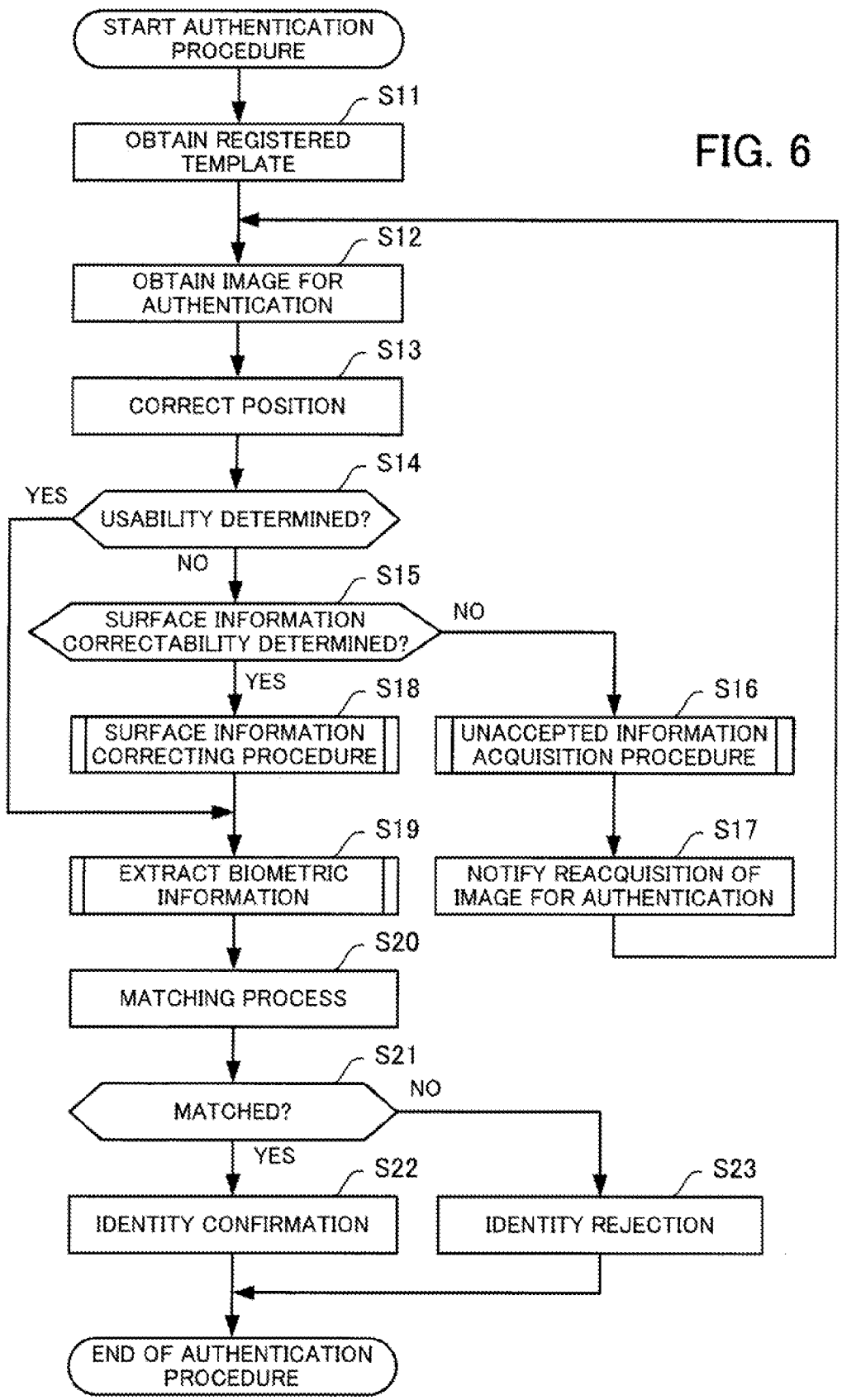
FIG. 6 is a flow chart of an authentication procedure of the second embodiment.

Next, an authentication procedure performed by the processing apparatus 21 will be described in detail referring to FIG. 6. FIG. 6 is a flow chart of the authentication procedure of the second embodiment. The processing apparatus 21 receives an authentication request from a user and performs the authentication procedure to obtain an authentication result.

[Step S11] The processing apparatus 21 obtains a registered template. The registered template may be obtained from a storage unit (HDD 103) of the processing apparatus 21, a storage unit of the authentication server 50, or a storage unit of the IC card 26 of the user. The processing apparatus 21 obtains the registered template corresponding to the user, based on information (e.g., user ID, card ID) by which the registered template may be uniquely identified. When the user is not identified at the start of the authentication procedure, the registered template may be obtained immediately before the matching.

[Step S12] The processing apparatus 21 obtains, from the sensor-unit-embedded mouse 24, a captured image used for authentication (image input unit 204).

[Step S13] The processing apparatus 21 extracts an object from the captured image (object extraction unit 205). The processing apparatus 21 determines whether or not the extracted object is the palm (palm determination unit 206). The processing apparatus 21 clips the palm from the object which has been determined to be the palm (palm clipping unit 207). The processing apparatus 21 corrects the image of the clipped palm to the correct position (contour correcting unit 208).

[Step S14] The processing apparatus 21 determines whether or not the image of the palm which has been corrected to the correct position is usable for matching. The determination is performed by comparing the image of the palm which has been corrected to the correct position with an image of the registered template, or comparing the image of the palm which has been corrected to the correct position with a model. When the processing apparatus 21 determines that the image of the palm which has been corrected to the correct position is usable for matching, the processing apparatus 21 proceeds to step S19, or proceeds to step S15 when the image is determined to be unusable for matching.

[Step S15] The processing apparatus 21 extracts surface information from the palm image which has been corrected to the correct position (surface information extraction unit 209). The processing apparatus 21 analyzes the concave/convex site of the palm from extracted surface information, and determines whether or not the surface information is correctable (surface information analysis unit 210). When the processing apparatus 21 determines that the surface information is correctable, the processing apparatus 21 proceeds to step S18, or proceeds to step S16 when the surface information is not determined to be correctable.

[Step S16] The processing apparatus 21 performs an unaccepted information acquisition procedure (unaccepted information acquisition unit 212). The unaccepted information acquisition procedure is a procedure of registering an unaccepted image in an unaccepted biometric information database and registering environment information at the time of capturing the unaccepted image in an unaccepted environment information database.

[Step S17] The processing apparatus 21 notifies the user of reacquisition in order to newly obtain an image for authentication. In addition, the processing apparatus 21 performs guidance for placing the user's palm to the correct position in order to newly obtain an appropriate image for authentication (guidance method selecting unit 213, notification unit 202).

[Step S18] When the surface information is within a correctable range, the processing apparatus 21 corrects the surface information (surface information correcting unit 211).

[Step S19] The processing apparatus 21 extracts biometric information to be used for matching, from a palm image having corrected surface information or a palm image not requiring correction of the surface information (biometric information extraction unit 214).

[Step S20] The processing apparatus 21 compares the extracted biometric information with the registered template which has been preliminarily registered to perform matching (matching unit 215).

[Step S21] The processing apparatus 21, when the matching is successful, in other words, when determining that the degree of matching exceeds a predetermined threshold, proceeds to step S22 based on the successful matching, or when the matching is unsuccessful, proceeds to step S23 based on the unsuccessful matching.

[Step S22] Upon receiving the result of successful matching, the processing apparatus 21 determines identity confirmation and, subsequent to performing a desired procedure associated with the successful authentication, terminates the authentication procedure.

[Step S23] Upon receiving the result of unsuccessful matching, the processing apparatus 21 determines identity rejection and, subsequent to performing a desired procedure associated with the failed authentication, terminates the authentication procedure.

Figure 7:
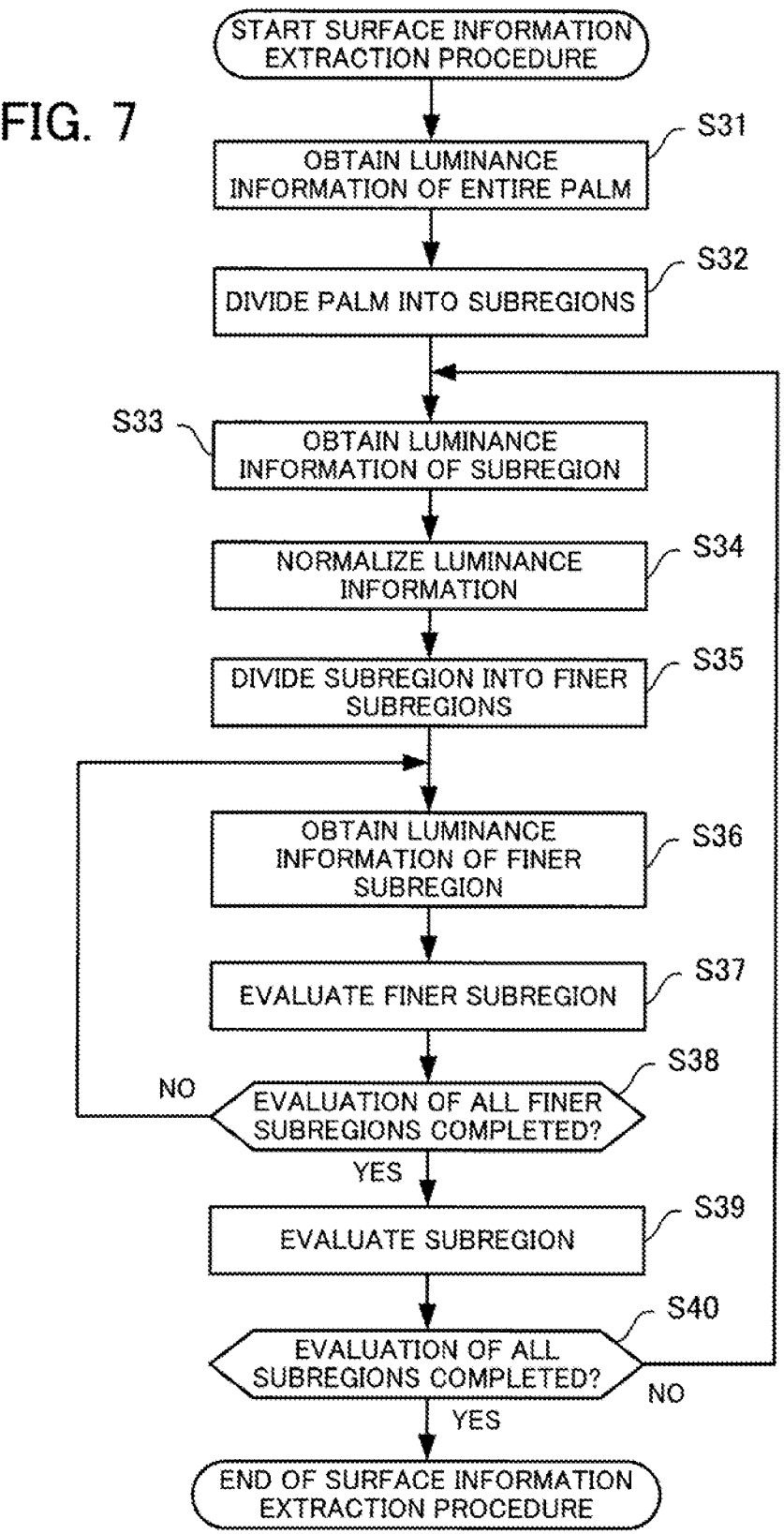
FIG. 7 is a flow chart of a surface information extraction procedure of the second embodiment.
Figure 8:
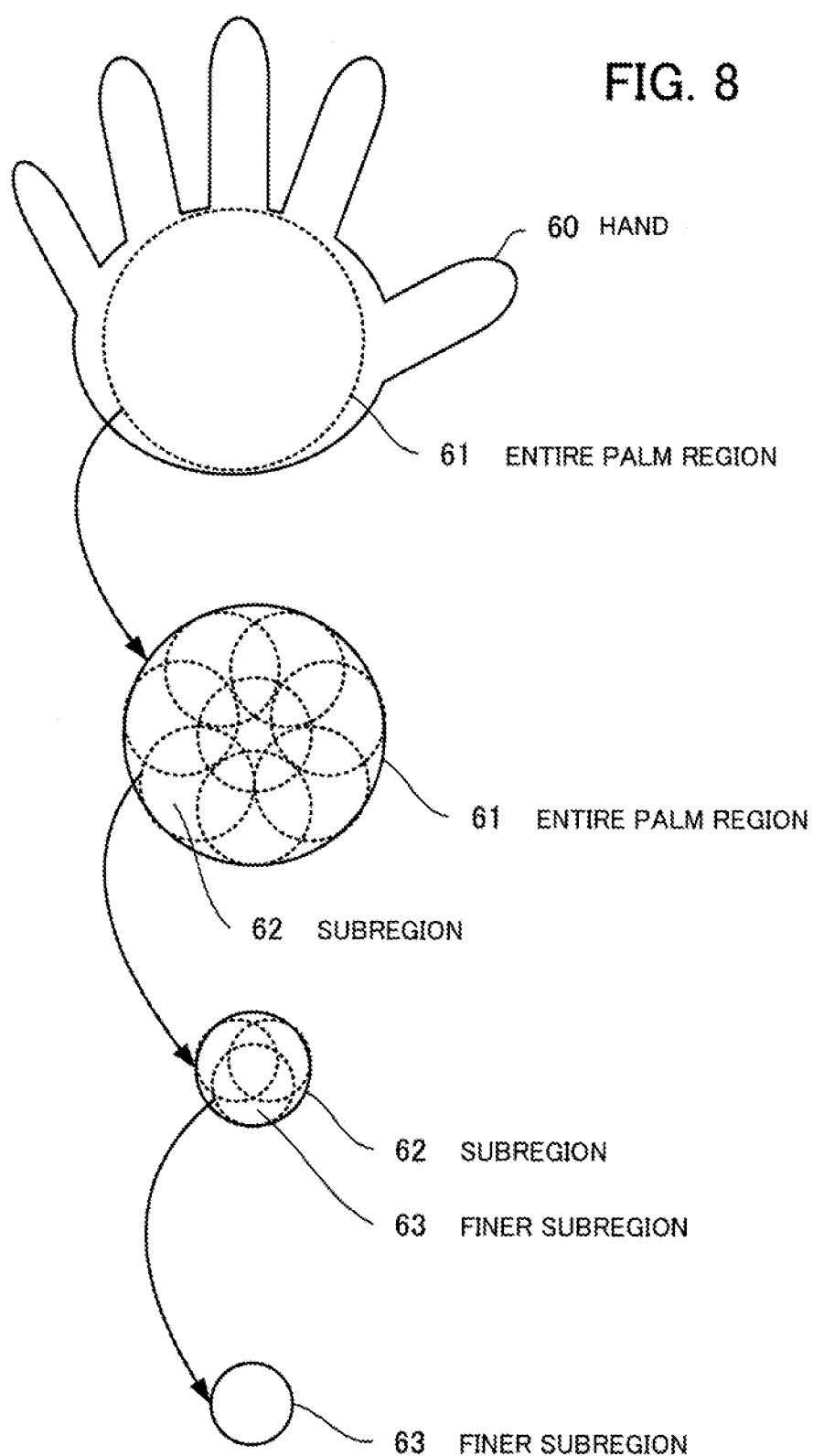
FIG. 8 illustrates an evaluation unit of surface information of the second embodiment.
Figure 9:
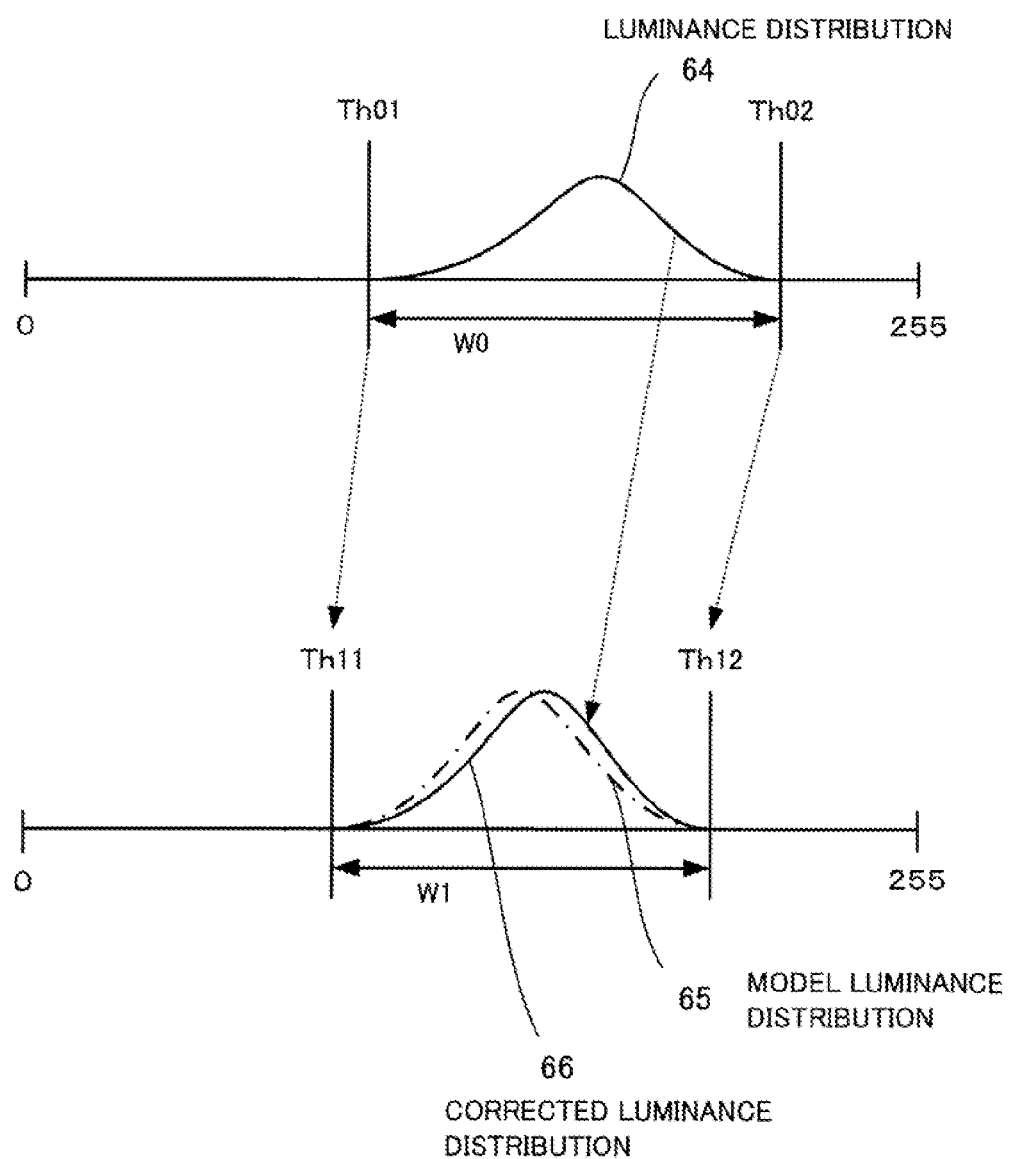
FIG. 9 illustrates normalization of luminance distribution of the second embodiment.
Figure 10A:
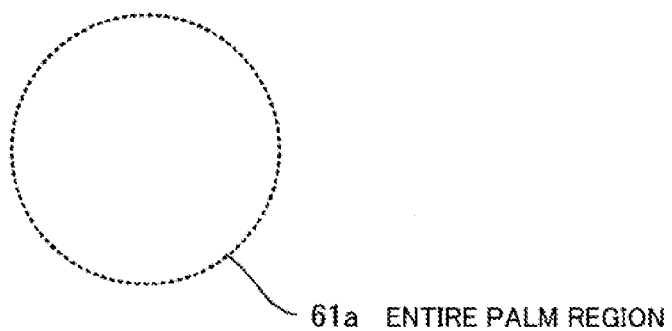
FIGS. 10A to 10C illustrate examples of surface information extraction of the second embodiment.
Figure 10B:
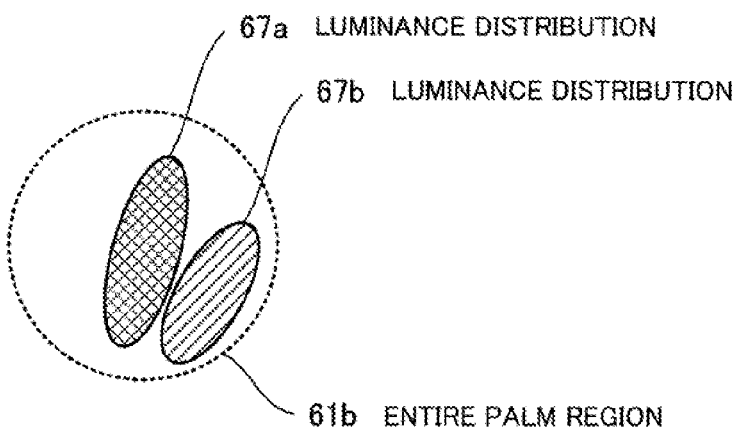
Figure 10C:
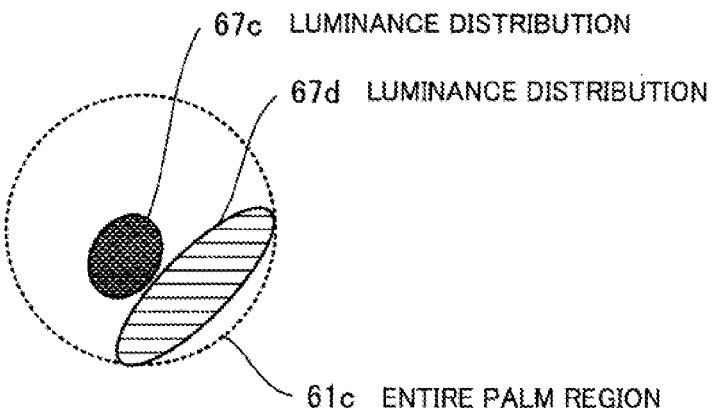

Next, a surface information extraction procedure performed by the surface information extraction unit 209 will be described in detail referring to FIGS. 7, 8, 9 and 10A to 10C. FIG. 7 is a flow chart of the surface information extraction procedure of the second embodiment. FIG. 8 illustrates an evaluation unit of the surface information of the second embodiment. FIG. 9 illustrates normalization of luminance distribution of the second embodiment. FIGS. 10A to 10C illustrate examples of surface information extraction of the second embodiment. The surface information extraction procedure is performed prior to determining whether or not correction of surface information is possible at step S15 of the authentication procedure.

[Step S31] The surface information extraction unit 209 obtains, from the palm image, luminance information of the entire palm. The region for which the surface information extraction unit 209 obtains luminance information is the entire palm region 61 corresponding to the palm of the hand 60 (see FIG. 8). Although the entire palm region 61 is a circular region, for example, it may be, without being limited thereto, an oval, a rectangle, polygons of other types, or a region surrounded by a free closed curve.

[Step S32] The surface information extraction unit 209 divides the entire palm region 61 into a plurality of subregions 62. The location of providing each subregion 62 has been preliminarily set. Each subregion 62 is arranged allowing existence of mutually overlapping regions (see FIG. 8).

[Step S33] The surface information extraction unit 209 obtains luminance information on one subregion 62.

[Step S34] The surface information extraction unit 209 normalizes the obtained luminance information. The surface information extraction unit 209 performs normalization of the luminance information using shift of luminance distribution and correction of luminance distribution range. For example, the surface information extraction unit 209 generates, from the obtained luminance information, a luminance distribution 64 within the range of gray scale (0 to 255). The luminance distribution 64 has a distribution range lower limit Th01, a distribution range upper limit Th02, and a distribution range W0. The surface information extraction unit 209 corrects and normalizes the luminance distribution 64 to a distribution range lower limit Th11, a distribution range upper limit Th12, and a distribution range W1 of a model luminance distribution 65 (see FIG. 9).

The above normalization makes it possible to objectively evaluate the state of surface information of the palm even when there exists variation of the object such as color or complexion of the user's palm, or variation of the photographing environment such as being outdoor or indoor.

[Step S35] The surface information extraction unit 209 divides the subregion 62 into a plurality of finer subregions 63. The location of providing each finer subregion 63 has been preliminarily set. Each finer subregion 63 is arranged allowing existence of mutually overlapping regions (see FIG. 8).

[Step S36] The surface information extraction unit 209 obtains corrected luminance information for one finer subregion 63.

[Step S37] The surface information extraction unit 209 evaluates, for one finer subregion 63 for which luminance information has been obtained, the degree of luminance and the size of luminance distribution. For example, the surface information extraction unit 209 evaluates the degree (brightness) of luminance and the size of luminance distribution by comparison with an ideal value. More specifically, the surface information extraction unit 209 evaluates the size of luminance distribution based on the range of luminance distribution within a predetermined range including the mode, and evaluates the degree of luminance by the average luminance of the distribution range to be evaluated. Evaluation of the degree of luminance is such as, in comparison with an ideal value, "considerably dark", "dark", "standard", "bright", and "considerably bright". In addition, evaluation of the size of luminance distribution is such as "wide", "narrow", and "moderate", in comparison with an ideal value.

[Step S38] The surface information extraction unit 209 determines, for the subregion 62 being evaluated, whether or not evaluation of the degree of luminance and the size of luminance distribution has been completed for all the finer subregions 63. The surface information extraction unit 209, when not having completed evaluation for all the finer subregions 63, proceeds to step S36, or proceeds to step S39 when having completed evaluation.

[Step S39] The surface information extraction unit 209 evaluates the corresponding subregion 62 from evaluation of all the finer subregions 63. The surface information extraction unit 209 calculates the size of luminance distribution of subregion 62 and the degree of luminance by evaluation of the subregion 62.

[Step S40] The surface information extraction unit 209 determines, for the entire palm region 61, whether or not evaluation has been completed for all the subregions 62. The surface information extraction unit 209, when not having completed evaluation for all the subregions 62, proceeds to step S33, or terminates the surface information extraction procedure when having completed evaluation.

FIGS. 10A to 10C illustrate examples in which the surface information extraction unit 209 has extracted surface information from the entire palm region 61a in the manner described above. When the luminance distribution exists within a predetermined range in comparison with a model (ideal value), the surface information extraction unit 209 extracts a uniform luminance distribution as surface information for the entire palm region 61a, as illustrated in FIG. 10A. When the luminance distribution is non-uniform in comparison with the model, the surface information extraction unit 209 extracts a non-uniform luminance distribution as surface information for the entire palm region 61b, as illustrated in FIG. 10B. The entire palm region 61b has, as non-uniform luminance distributions, a luminance distribution 67a and a luminance distribution 67b. The luminance distribution 67a is evaluated as being "dark", and the luminance distribution 67b is evaluated as being "bright". Since the dark part indicates a concave and the bright part indicates a convex, it is recognized that the entire palm region 61b is of a slightly rounded palm. When the luminance distribution is non-uniform in comparison with the model, the surface information extraction unit 209 extracts a non-uniform luminance distribution as surface information for the entire palm region 61c, as illustrated in FIG. 10C. The entire palm region 61c has a luminance distribution 67c and a luminance distribution 67d as non-uniform luminance distributions. The luminance distribution 67c is evaluated as being "considerably dark", and the luminance distribution 67d is evaluated as being "considerably bright". Since the considerably dark part indicates a strong concavity and the considerably bright part indicates a strong convexity, it is recognized that the entire palm region 61c is of a slightly rounded palm.

In the manner described above, the authentication apparatus 20 is able to recognize the state of the palm based on the surface information extracted by the surface information extraction unit 209.

Figure 11:
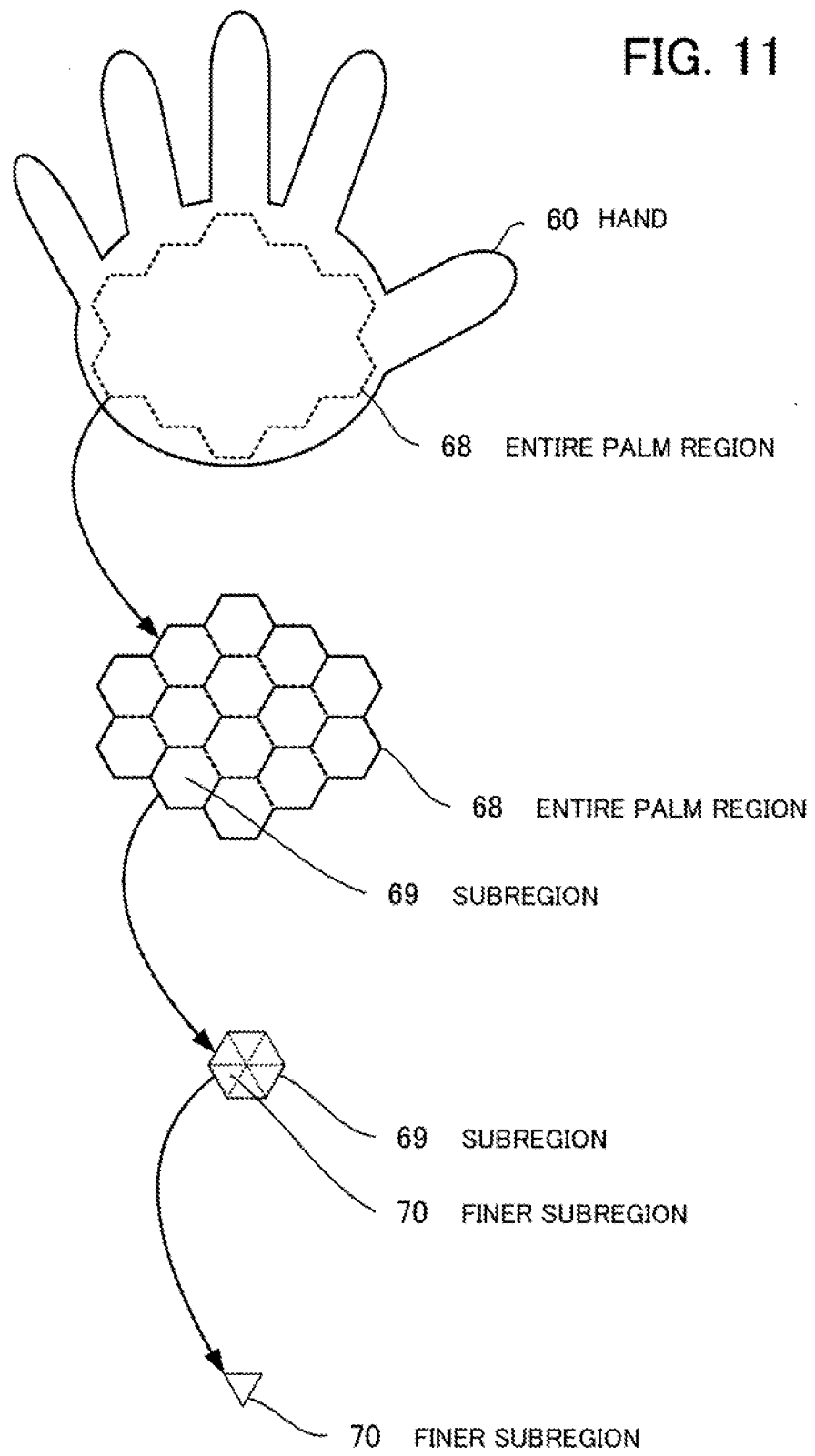
FIG. 11 illustrates a variation of the evaluation unit of surface information of the second embodiment.

Here, a variation of the evaluation unit of the surface information described referring to FIG. 8 will be described referring to FIG. 11. FIG. 11 illustrates a variation of the evaluation unit of the surface information of the second embodiment.

The entire palm region 68 is a region, of the hand 60, for which the surface information extraction unit 209 obtains luminance information. The entire palm region 68 is a region having a plurality of subregions 69 collected therein. The location of arranging each subregion 69 has been preliminarily set. Each subregion 69 has no mutually overlapping regions and is arranged adjacent to each other. A subregion 69 is a region having a plurality of finer subregions 70 collected therein. The location of arranging each finer subregion 70 has been preliminarily set. Each finer subregion 70 has no mutually overlapping regions and is arranged adjacent to each other. A variation of the evaluation unit of the surface information is different from the second embodiment in that in the variation, the entire palm region 68, the subregion 69, and the finer subregion 70 are respectively different in shape, whereas in the second embodiment, the entire palm region 61, the subregion 62, and the finer subregion 63 are respectively homothetic.

Figure 12:
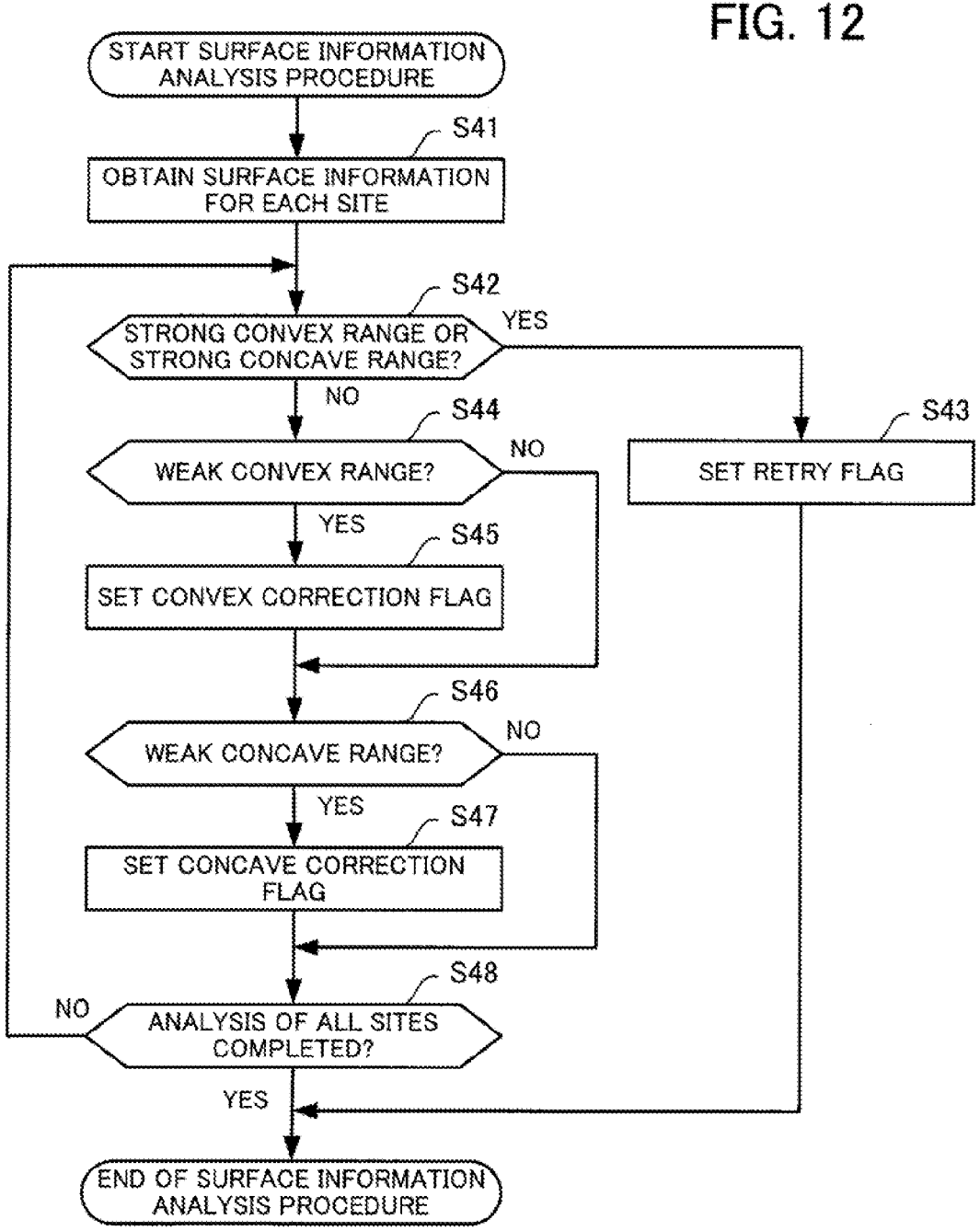
FIG. 12 is a flow chart of a surface information analysis procedure of the second embodiment.

Next, a surface information analysis procedure performed by the surface information analysis unit 210 will be described in detail, referring to FIGS. 12 and 13A to 13D. FIG. 12 is a flow chart of the surface information analysis procedure of the second embodiment. FIGS. 13A to 13D illustrate examples of surface information analysis of the second embodiment. The surface information analysis procedure is performed subsequent to surface information extraction at step S15 of the authentication procedure.

Figure 13A:
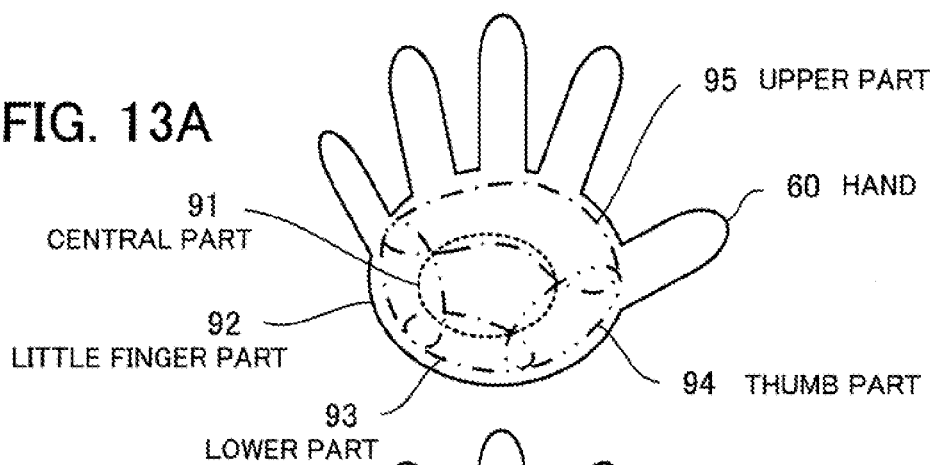
FIGS. 13A to 13D illustrate examples of surface information analysis of the second embodiment.

[Step S41] The surface information analysis unit 210 obtains, for each site, surface information (strength/weakness and range of concavity/convexity) extracted by the surface information extraction unit 209. Here, a site, which refers to a region of the palm divided into a plurality of regions, is predefined. Each site is related in association with one or more of the subregions 62 described above. For example, there are five types of parts, i.e., a central part 91 located at the center of the palm of the hand 60, an upper part 95 and a lower part 93 located above and below the central part 91, and a thumb part 94 and a little finger part 92 located at the right and left of the central part 91 (FIG. 13A). Alternatively, each site may be defined in association with the skeleton and muscles of a human, such as being divided into six parts, i.e., the first to fifth metacarpal bones and the carpal bone.

[Step S42] The surface information analysis unit 210 determines, for one of the plurality of sites, whether or not it is a strong convex range or a strong concave range. Determination of whether a site is a strong convex range or a strong concave range is performed by comparison with a predetermined threshold. When the surface information analysis unit 210 determines that either a strong convex range or a strong concave range exists in a site to be determined, the surface information analysis unit 210 proceeds to step S43. When the surface information analysis unit 210 determines that neither a strong convex range nor a strong concave range exists in the site to be determined, the surface information analysis unit 210 proceeds to step S44.

[Step S43] Assuming that the site to be determined is uncorrectable, the surface information analysis unit 210 sets a retry flag and terminates the surface information analysis procedure. Setting of the retry flag causes the authentication apparatus 20 to perform re-acquisition of an image for authentication.

[Step S44] The surface information analysis unit 210 determines whether or not the site to be determined is a weak convex range. Determination of a weak convex range is performed by comparison with a predetermined threshold. When the surface information analysis unit 210 determines that there is a weak convex range in the site to be determined, the surface information analysis unit 210 proceeds to step S45. The surface information analysis unit 210, when determining that there is no weak convex range in the site to be determined, proceeds to step S46.

[Step S45] The surface information analysis unit 210 sets a convex correction flag to the site to be determined.

[Step S46] the surface information analysis unit 210 determines whether or not the site to be determined is a weak concave range. Determination of being a weak concave range is performed by comparison with a predetermined threshold. The surface information analysis unit 210, when determining that there is a weak concave range in the site to be determined, proceeds to step S47. The surface information analysis unit 210, when determining that there is no weak concave range in the site to be determined, proceeds to step S48.

[Step S47] The surface information analysis unit 210 sets a concave correction flag to the site to be determined.

[Step S48] The surface information analysis unit 210 determines whether or not analysis has been completed for all of the plurality of sites. When analysis has not been completed for all of the plurality of sites, the surface information analysis unit 210 proceeds to step S42 in order to analyze the site for which analysis has not been completed yet. When analysis has been completed for all of the plurality of sites, the surface information analysis unit 210 terminates the surface information analysis procedure.

As thus described, the surface information analysis unit 210 completes the analysis of surface information (concavity/convexity information of the palm surface) by determining the validity of the set of the convex correction flag and the concave correction flag for all of the plurality of sites. In addition, the surface information analysis unit 210 sets a retry flag when there is a strong convex range or a strong concave range in at least one of the plurality of sites, and regards the image to be analyzed as inappropriate for authentication.

Figure 13B:
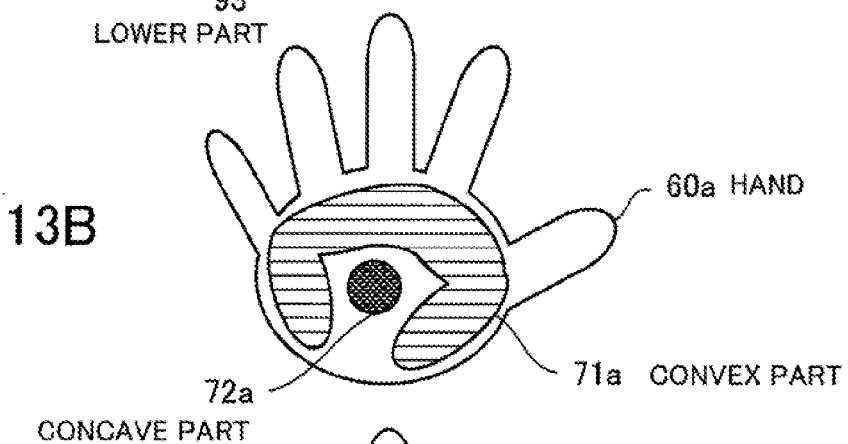
Figure 13C:
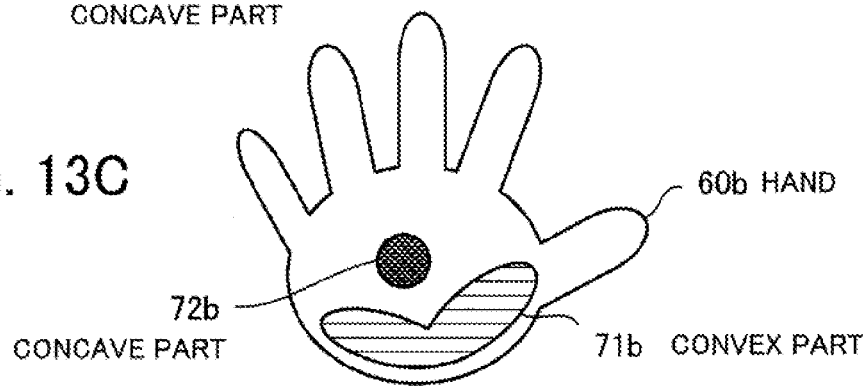
Figure 13D:
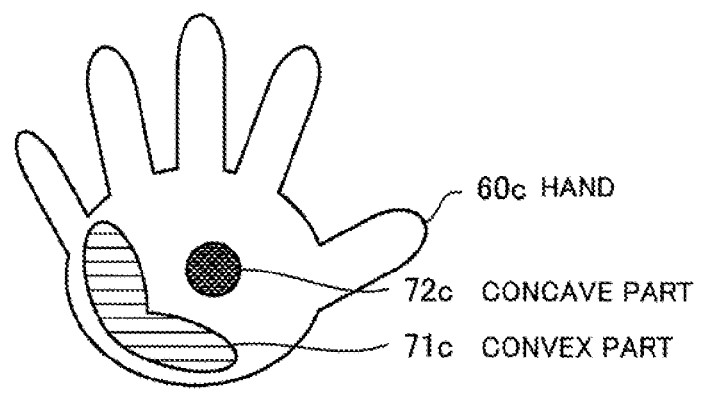

An exemplary surface information analysis evaluated to be inappropriate for such an authentication is illustrated in FIGS. 13B to 13D. A hand 60a provides an exemplary surface information analysis for a strong convex part 71a and a strong concave part 72a. The hand 60a may be evaluated to be in a state with the palm being rounded. A hand 60b provides an exemplary surface information analysis for a strong convex 71b and a strong concave 72b. The hand 60b may be evaluated to be in a state that the thumb is lower than the palm. A hand 60c provides an exemplary surface information analysis for a strong convex 71c and a strong concave 72c. The hand 60c may be evaluated to be in a state with the little finger being lower than the palm. As thus described, since the result of analysis by the surface information analysis unit 210 may evaluate the state of the hand 60, it becomes possible to set a retry flag to indicate an inappropriate posture and provide an appropriate guidance when re-obtaining an image for authentication.

Figure 14:
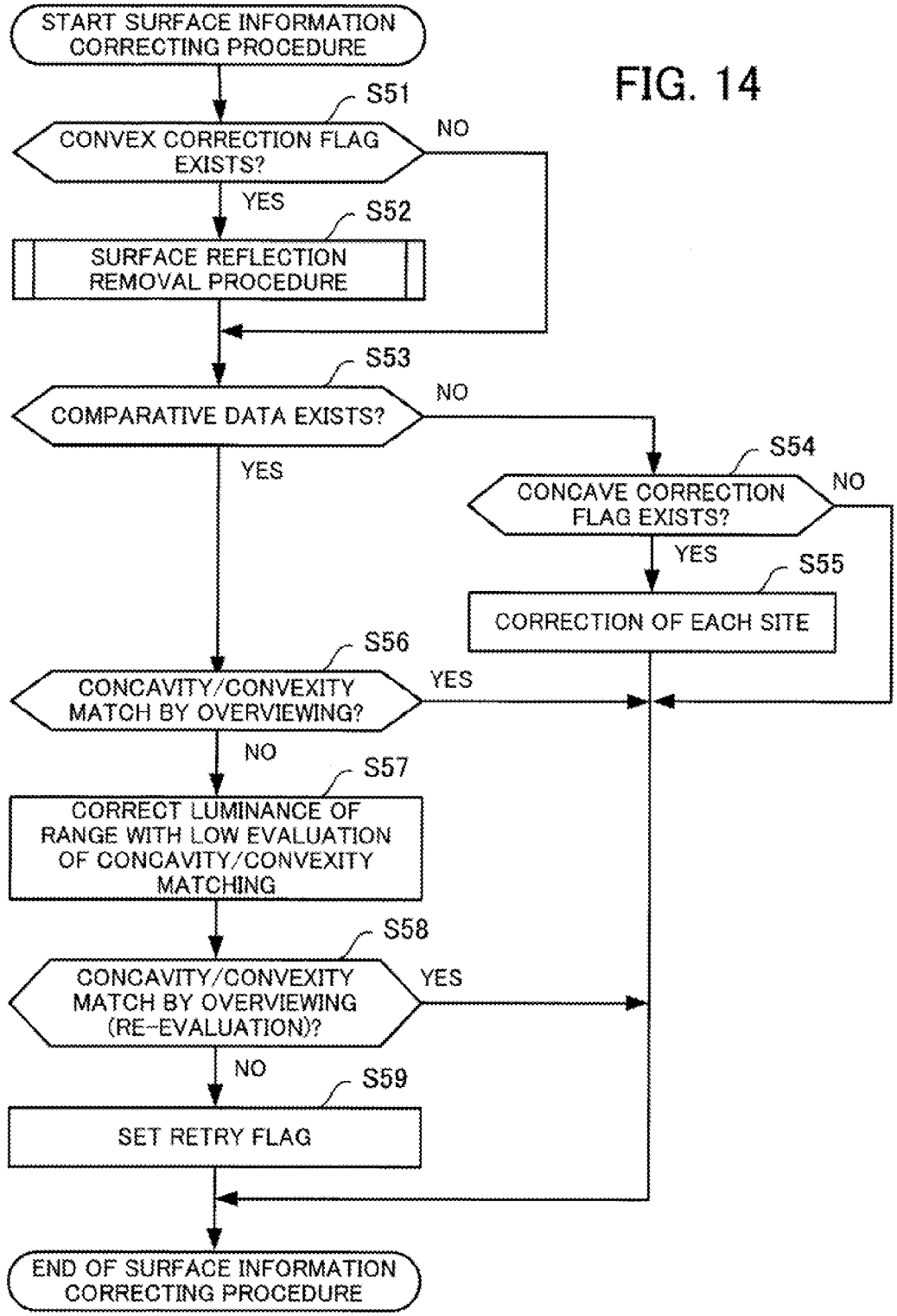
FIG. 14 is a flow chart of a surface information correcting procedure of the second embodiment.

Next, a surface information correcting procedure performed by the surface information correcting unit 211 will be described in detail, referring to FIG. 14. FIG. 14 is a flow chart of the surface information correcting procedure of the second embodiment. The surface information correcting procedure is performed at step S18 of the authentication procedure.

[Step S51] The surface information correcting unit 211 determines whether or not a convex correction flag is set for the each site analyzed by the surface information analysis unit 210. The surface information correcting unit 211, when determining that a convex correction flag has been set, proceeds to step S52, or proceeds to step S53 when determining that the convex correction flag has not been set.

[Step S52] The surface information correcting unit 211 performs a surface reflection removal procedure to remove surface reflection of the palm image. Details of the surface reflection removal procedure will be described later, referring to FIGS. 15, 16 and 17A to 17D.

[Step S53] The surface information correcting unit 211 determines whether or not there exists comparative data to be compared with the palm image. When there exists comparative data, the surface information correcting unit 211 proceeds to step S56, or proceeds to step S54 when there is no comparative data. The comparative data is a registered template of a user, for example. The registered template may be obtained based on a user ID input by a user. When a registered template of the user is not obtainable, such as when preliminary input of the user ID is not needed, the surface information correcting unit 211 may use comparative data as a standard model. The comparative data when using a registered template may be a marginal model for which a predetermined tolerance is provided based on the registered template, instead of the registered template itself.

[Step S54] The surface information correcting unit 211 determines whether or not a concave correction flag is set for each site analyzed by the surface information analysis unit 210. The surface information correcting unit 211, when determining that a concave correction flag has been set, proceeds to step S55, or terminates the surface information correcting procedure when determining that a concave correction flag has not been set.

[Step S55] The surface information correcting unit 211 performs luminance correction for each site in the absence of comparative data of a palm image. The surface information correcting unit 211 performs luminance correction by offsetting the average value of luminance for each site so as to conform with the overall average, for example. For luminance correction, the median or the mode may also be used without being limited to the average luminance for each site. In addition, luminance correction for each site may perform luminance correction with different rules for each site. After having performed luminance correction for each site, the surface information correcting unit 211 terminates the surface information correcting procedure.

[Step S56] When there exists comparative data of the palm image, the surface information correcting unit 211 overviews the entire palm to evaluate the concavity/convexity matching. When the evaluation of concavity/convexity matching falls within a range of a predetermined threshold, the surface information correcting unit 211 terminates the surface information correcting procedure. When, on the other hand, the evaluation of concavity/convexity matching does not fall within a range of the predetermined threshold, the surface information correcting unit 211 proceeds to step S57.

[Step S57] The surface information correcting unit 211 performs luminance correction, for a range with a low evaluation of concavity/convexity matching, so as to correct the average value of luminance which has expanded to peripheral areas. The surface information correcting unit 211 performs luminance correction by offsetting the average value of luminance of a site to be corrected and the peripheral region thereof so as to conform with the overall average, for example.

[Step S58] The surface information correcting unit 211 overviews the entire palm to reevaluate the concavity/convexity matching. When the re-evaluation of concavity/convexity matching falls within a range of a predetermined threshold, the surface information correcting unit 211 terminates the surface information correcting procedure. When, on the other hand, the re-evaluation of concavity/convexity matching does not fall within a range of a predetermined threshold, the surface information correcting unit 211 proceeds to step S59.

[Step S59] Assuming that the palm image is uncorrectable, the surface information correcting unit 211 sets a retry flag and terminates the surface information correcting procedure. Setting of the retry flag causes the authentication apparatus 20 to perform re-acquisition of an image for authentication.

In this manner, the surface information correcting unit 211 rectifies the slight variation of biometric information and environmental changes within tolerance by correcting concave/convex sites. Accordingly, the authentication apparatus 20 reduces the opportunities to perform re-acquisition of an image for authentication.

Figure 15:
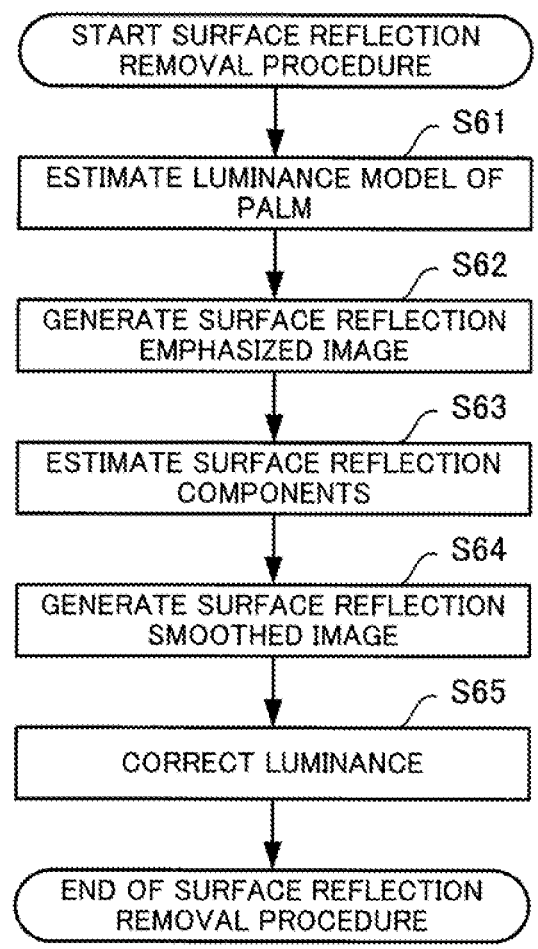
FIG. 15 is a flow chart of a surface reflection removal procedure of the second embodiment.
Figure 16:
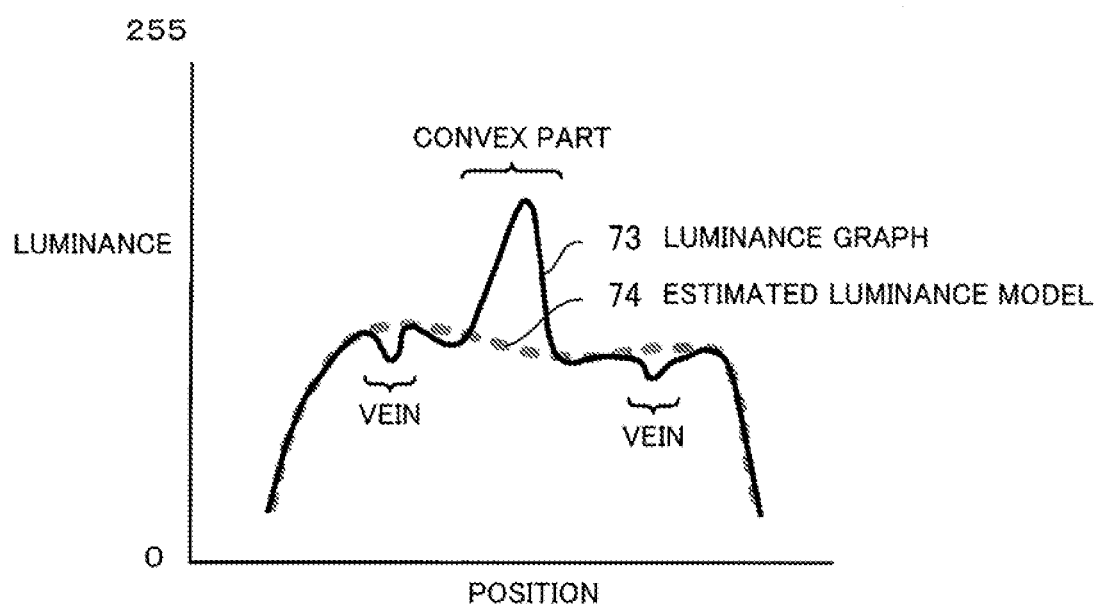
FIG. 16 illustrates surface reflection removal from the luminance distribution of the second embodiment.

Next, a surface reflection removal procedure performed by the surface information correcting unit 211 will be described in detail, referring to FIGS. 15, 16 and 17A to 17D. FIG. 15 is a flow chart of the surface reflection removal procedure of the second embodiment. FIG. 16 illustrates removal of surface reflection from the luminance distribution of the second embodiment. FIGS. 17A to 17D illustrate examples of surface reflection removal process of the second embodiment. The surface reflection removal procedure is performed at step S52 of the surface information correcting procedure.

Figure 17A:
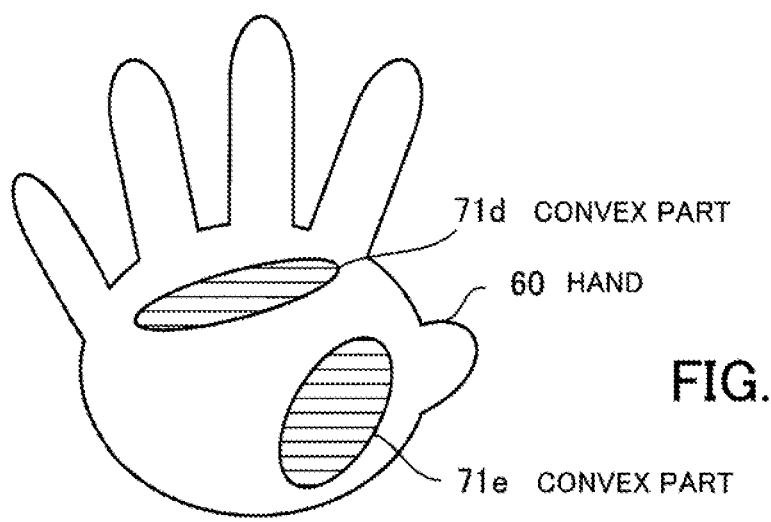
FIGS. 17A to 17D illustrate an example of surface reflection removal process of the second embodiment.
Figure 17B:
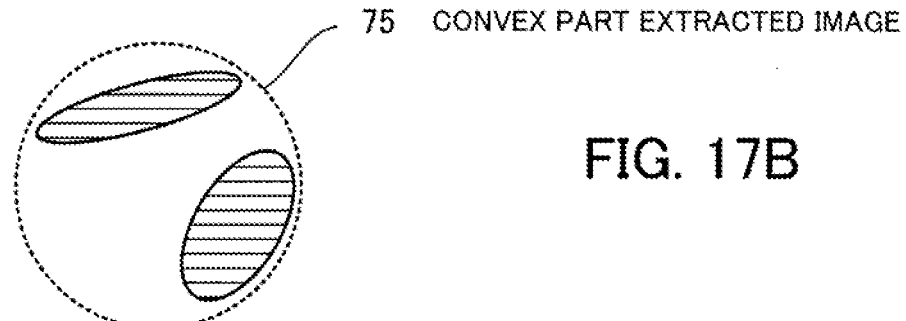
Figure 17C:
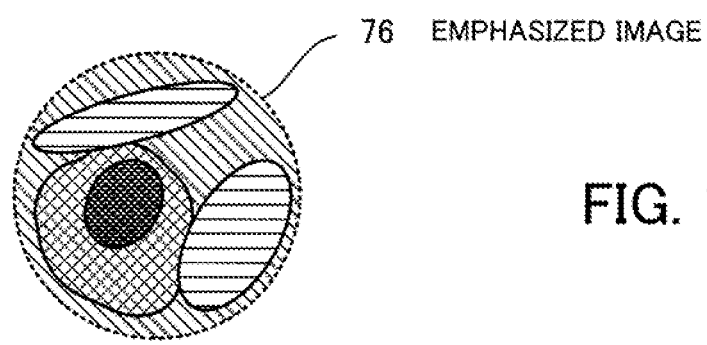
Figure 17D:
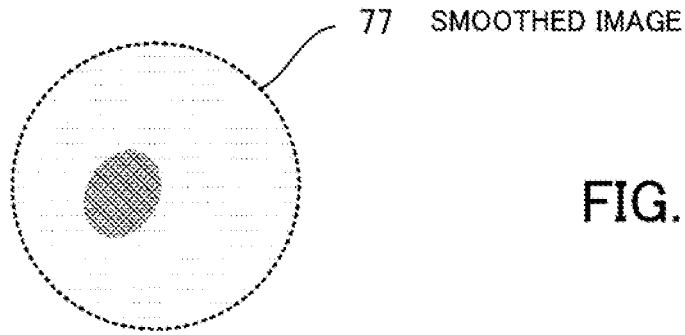

[Step S61] The surface information correcting unit 211 estimates the luminance model of the palm from the palm image (FIG. 17A). The surface information correcting unit 211 obtains, by a spline function, an estimated luminance model 74 from a luminance graph 73 illustrating the result of scanning the palm surface luminance in the lateral direction. The surface information correcting unit 211 removes a high-frequency component such as the vein which is darker than the bright convex and the periphery, using a low-order (e.g., second order) spline function. The surface information correcting unit 211 estimates the luminance model of the entire palm from a plurality of estimated luminance models 74 displaced in the vertical direction in a similar manner. In addition, known methods may be used for the luminance model of the palm image such as estimating from the luminance gradient, for example.

[Step S62] The surface information correcting unit 211 extracts, from the difference between the luminance graph 73 and the estimated luminance model 74, a convex part (e.g., convex part 71d, convex part 71e) exhibiting surface reflection (e.g., convex part extracted image 75 (FIG. 17B)). The surface information correcting unit 211 obtains a surface reflection emphasized image (e.g., emphasized image 76 (FIG. 17C) emphasizing surface reflection from the palm image.

[Step S63] The surface information correcting unit 211 estimates the surface reflection components included in the surface reflection emphasized image.

[Step S64] The surface information correcting unit 211 generates a surface reflection smoothed image (e.g., smoothed image 77 (FIG. 17D)) having the surface reflection components removed from the surface reflection emphasized image to smooth surface reflection.

[Step S65] The surface information correcting unit 211 corrects luminance of the palm image based on the generated surface reflection smoothed image, and terminates the surface reflection removal procedure. Known methods may be used for correction of the luminance of the palm image, such as removing the effects of non-uniform illumination, for example.

As thus described, the surface information correcting unit 211 may preferably remove surface reflection by emphasizing surface reflection of the palm image and subsequently removing surface reflection components.

Figure 18:
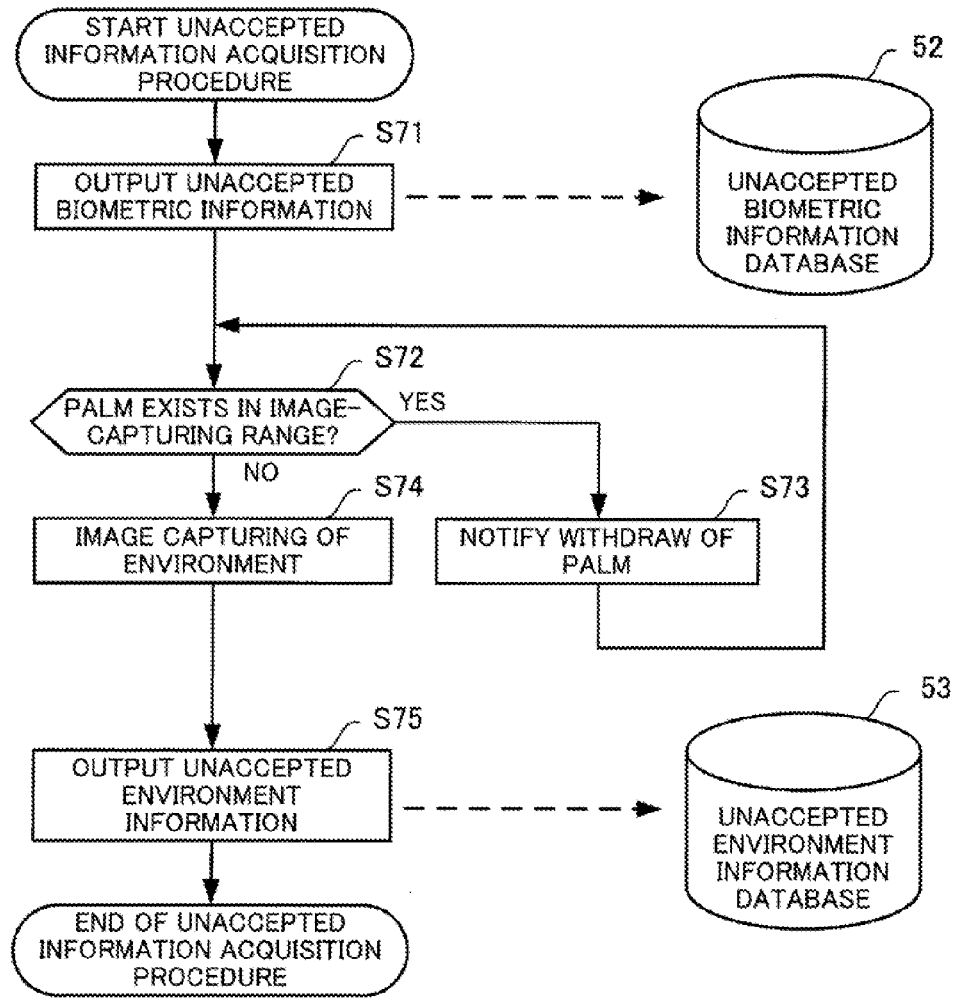
FIG. 18 is a flow chart of an unaccepted information acquisition procedure of the second embodiment.
Figure 20A:
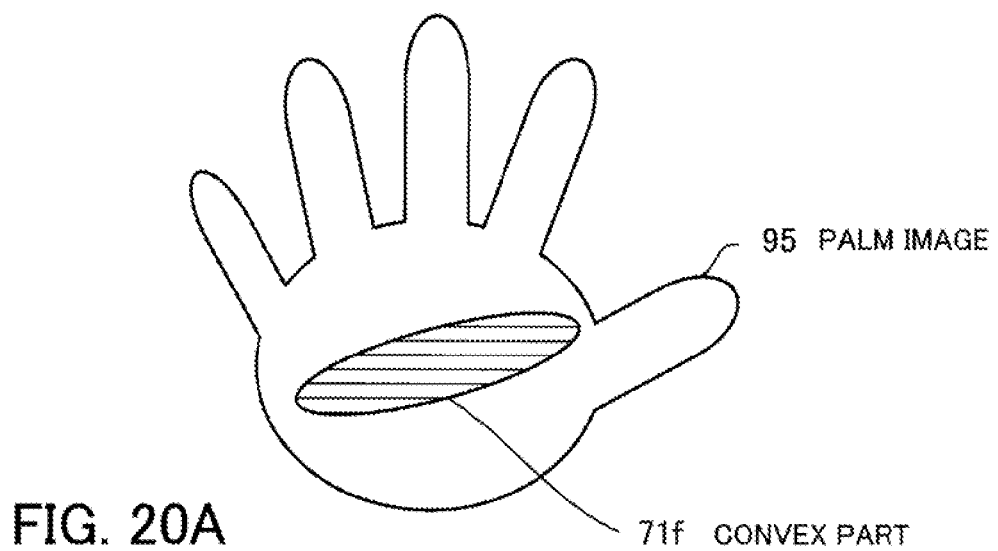
FIGS. 20A and 20B illustrate examples of unaccepted image of the second embodiment.
Figure 20B:
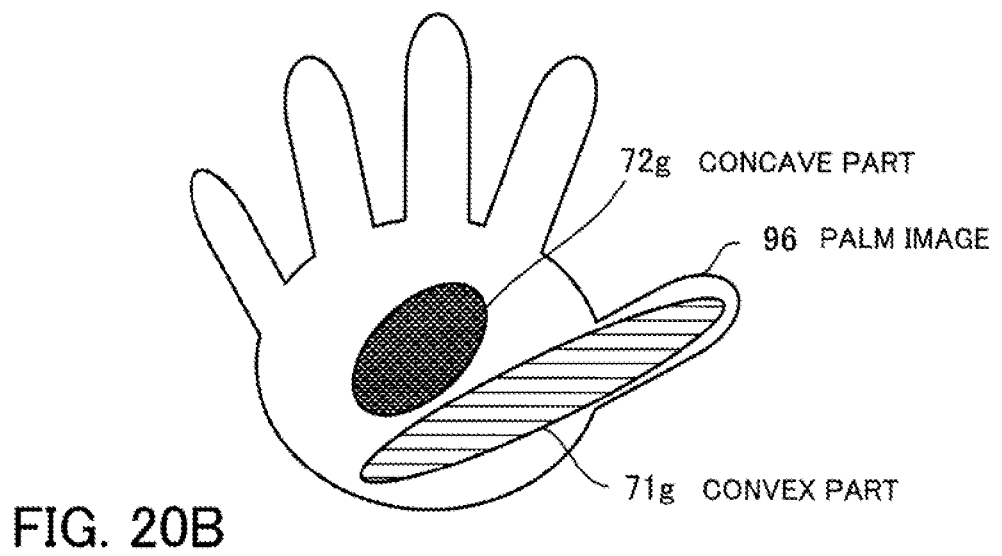

Next, an unaccepted information acquisition procedure performed by the unaccepted information acquisition unit 212 will be described in detail, referring to FIGS. 18, 19, 20A, 20B, 21 and 22A to 22D. FIG. 18 is a flow chart of the unaccepted information acquisition procedure of the second embodiment. FIG. 19 illustrates an example of unaccepted biometric information of the second embodiment. FIGS. 20A and 20B illustrate examples of unaccepted image of the second embodiment. FIG. 21 illustrates an example of unaccepted environment information of the second embodiment. FIGS. 22A to 22D illustrate examples of photographing environment image of the second embodiment. The unaccepted information acquisition procedure is performed at step S16 of the authentication procedure when it is not possible to correct surface information.

[Step S71] The unaccepted information acquisition unit 212 outputs, as unaccepted biometric information, a captured image which is impossible to correct surface information and information on the captured image, and updates an unaccepted biometric information database 52.

[Step S72] The unaccepted information acquisition unit 212 determines whether or not there exists a palm in the photographing range. The unaccepted information acquisition unit 212 determines whether or not there exists a palm in the photographing range by obtaining a current captured image from the sensor-unit-embedded mouse 24. The unaccepted information acquisition unit 212, when determining that there exists a palm in the photographing range, proceeds to step S73, or proceeds to step S74 when determining that there is no palm in the photographing range.

[Step S73] The unaccepted information acquisition unit 212 instructs the notification unit 202 to perform notification of withdrawing the palm from the photographing range. Upon receiving the instruction, the notification unit 202 prompts, by display or voice, the user to withdraw the palm from the photographing range. In this manner, the unaccepted information acquisition unit 212 waits for the palm to be withdrawn from the photographing range.

[Step S74] The unaccepted information acquisition unit 212 obtains a video image (environmental video image) with no palm in the photographing range. The unaccepted information acquisition unit 212 obtains a current captured image from the sensor-unit-embedded mouse 24, and obtains a video image with no palm in the photographing range.

[Step S75] The unaccepted information acquisition unit 212 outputs, as unaccepted environment information, information on the obtained environmental video image and the environment (unaccepted environment) that led to acquisition of the captured image for which surface information is uncorrectable, and updates the unaccepted environment information database 53. After having updated the unaccepted environment information database 53, the unaccepted information acquisition unit 212 terminates the unaccepted information acquisition procedure.

Unaccepted biometric information 300 is an example of unaccepted biometric information updated at step S71. The unaccepted biometric information 300 is an example of unaccepted biometric information managed by the unaccepted biometric information database 52. The unaccepted biometric information includes the information on the palm image which turned out to be unaccepted by matching, such as identification number, date, time, user ID, retry (number of retry times), unaccepted living body image, and failure reason, and information on the palm image.

Identification number refers to the identification information for uniquely specifying a matching which turned out to have failed. Date and time respectively refer to the date and time of the matching which turned out to have failed. Time may be information in units of seconds, as well as hours and minutes. User ID refers to the identification information for uniquely specifying a user. Retry refers to the accumulated number of times the retry flag is set. Unaccepted living body image refers to the palm image used for matching. For example, a palm image 95 is an unaccepted living body image having a strong convex part 71f (FIG. 20A). In addition, a palm image 96 is an unaccepted living body image having a strong convex part 71g and a strong concave part 72g (FIG. 20B). Failure reason refers to the reason why the palm image turned out to be unaccepted by matching.

Unaccepted environment information 310 is an example of unaccepted environment information updated at step S75. The unaccepted environment information 310 is an example of unaccepted environment information managed by unaccepted environment information database 53. The unaccepted environment information is the information on the environment which turned out to be unaccepted by matching, such as identification number, date, time, user ID, unaccepted environment image, sensor ID, illumination, temperature, humidity, physical condition, or the like.

Figure 22A:
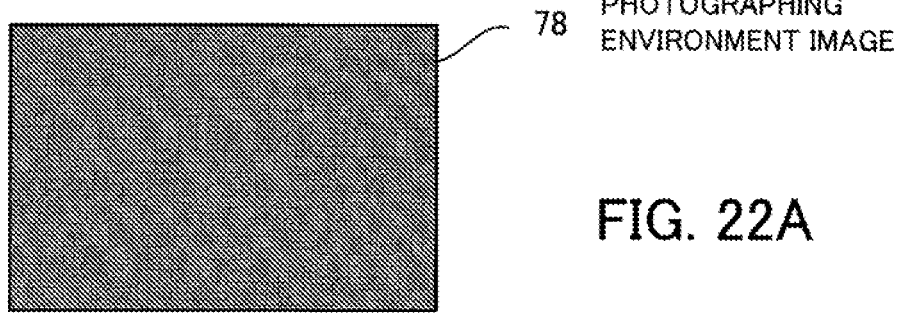
FIGS. 22A to 22D illustrate examples of photographing environment image of the second embodiment.
Figure 22B:
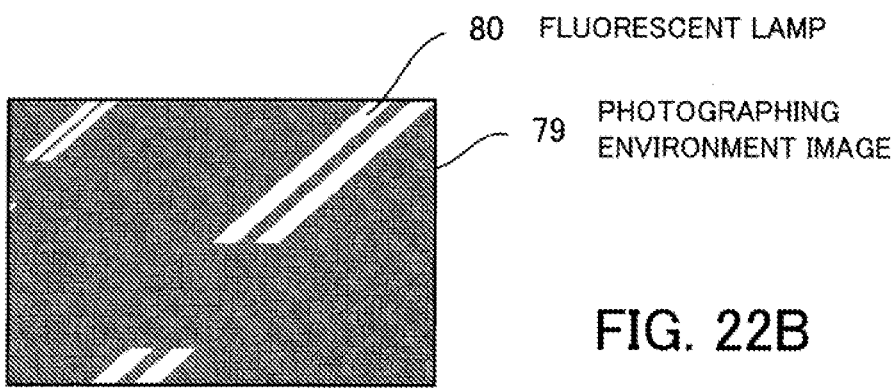
Figure 22C:
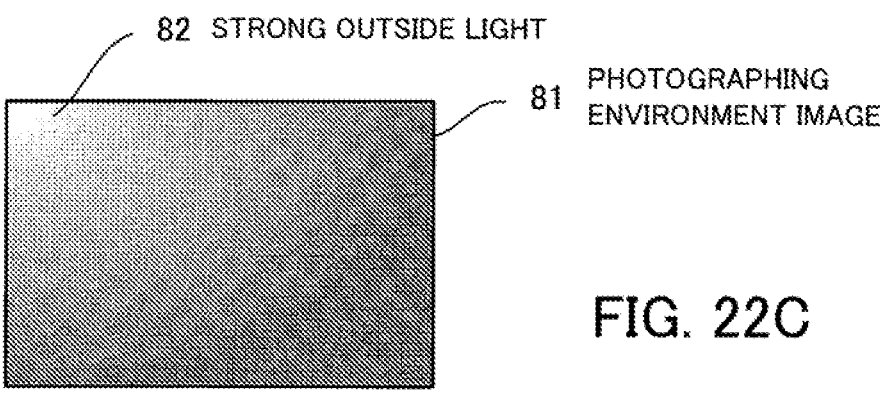
Figure 22D:
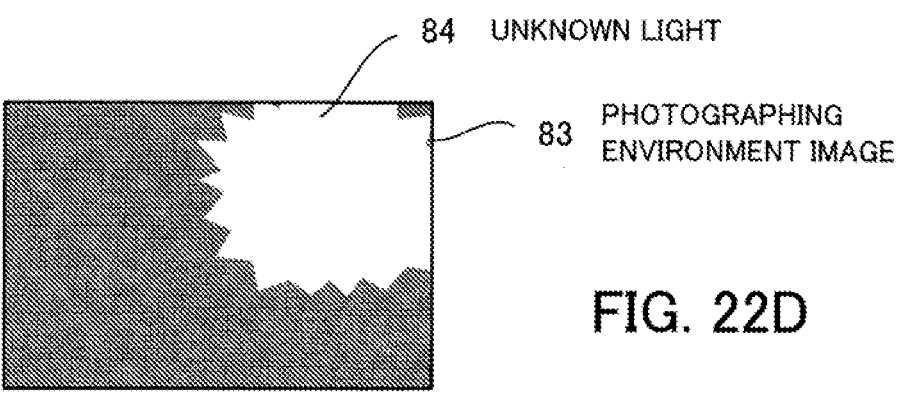

Identification number refers to the identification information for uniquely specifying a matching which turned out to have failed. Date and time respectively refer to the date and time of the matching which turned out to have failed. Time may be information in units of seconds, as well as hours and minutes. User ID refers to the identification information for uniquely specifying a user. Unaccepted environment image refers to the photographing environment image at the time of image-capturing of the palm (matching). For example, a photographing environment image 78 is a good photographing environment image (FIG. 22A). On the other hand, a photographing environment image 79 is an unaccepted environment image with a fluorescent lamp 80 appearing therein (FIG. 22B). In addition, a photographing environment image 81 is an unaccepted environment image with strong outside light 82 appearing (FIG. 22C). In addition, a photographing environment image 83 is an unaccepted environment image with an unknown light 84 appearing (FIG. 22D). These unaccepted environment images do not always include the reason of matching failure in the photographing environment. Sensor ID refers to the identification information for uniquely specifying the ID of the sensor unit which has captured the palm image. Illumination refers to the information indicating ON/OFF of illumination of the ambient environment of the authentication apparatus 20 at the time of photographing of the palm. Temperature and humidity respectively refer to the temperature and humidity in the ambient environment of the authentication apparatus 20. Physical condition refers to the physical condition of the user.

In order to collect information on the ambient environment, the authentication apparatus 20 may be provided with a sensor (not illustrated) which measures the temperature, humidity, illuminance, or the like. In addition, the authentication apparatus 20 is able to obtain, by communication, ambient environment information from a management apparatus (not illustrated) which manages illumination and air conditioning. In addition, the authentication apparatus 20 is able to obtain physical condition of the user from an input apparatus which is not illustrated. The authentication apparatus 20 may also obtain other ambient environment information such as weather, self-evaluation of the motion of holding the palm, or the like.

The authentication apparatus 20 allows a more appropriate guidance of the palm by enriching the information accumulated in the unaccepted biometric information database 52 and the unaccepted environment information database 53. In addition, enrichment of the information accumulated in the unaccepted biometric information database 52 and the unaccepted environment information database 53 contributes to improvement of extraction, analysis, and correction of surface information by the authentication apparatus 20.

Figure 23:
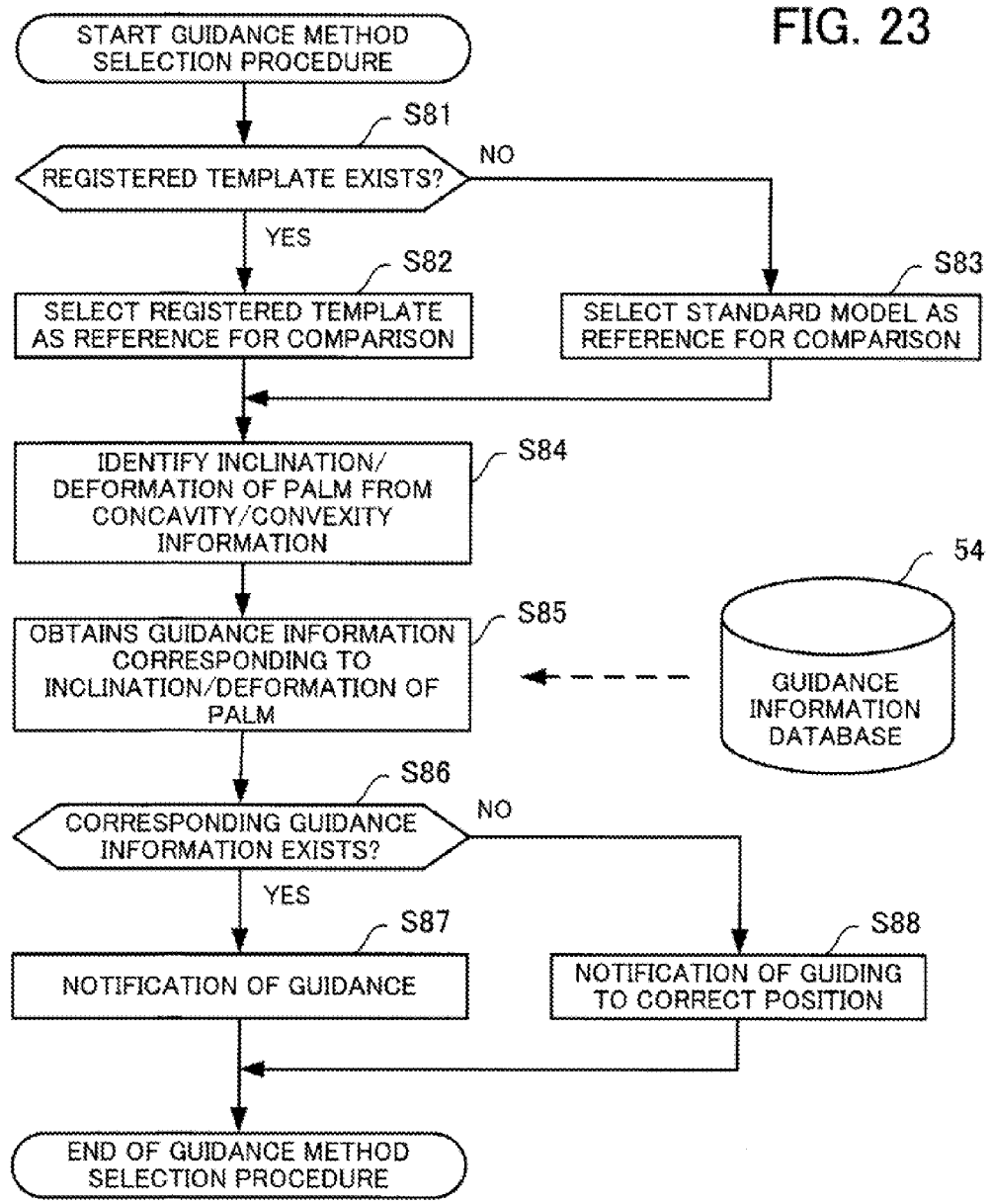
FIG. 23 is a flow chart of a guidance method selection procedure of the second embodiment.
Figure 25:
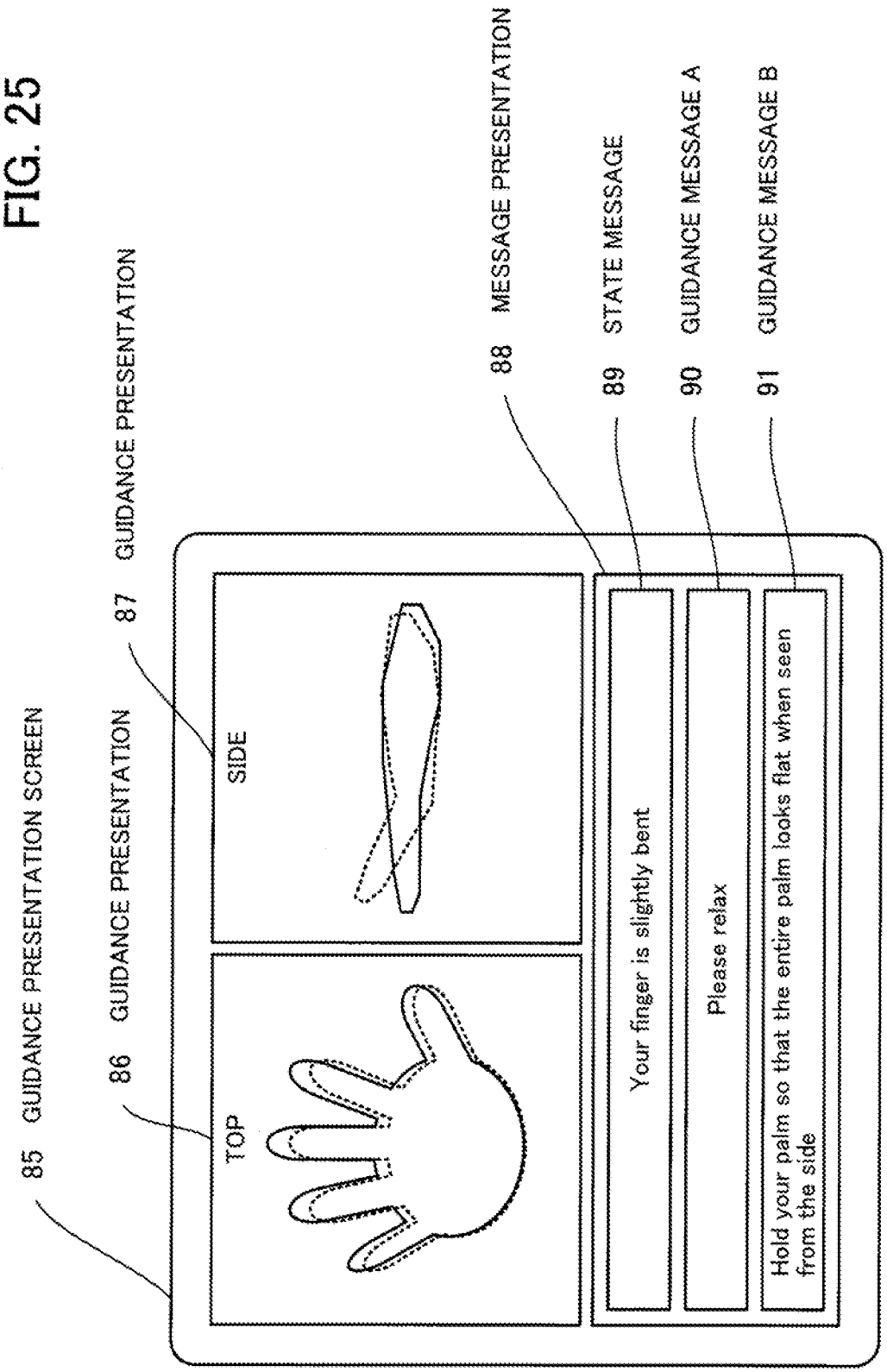
FIG. 25 illustrates an exemplary guidance presentation screen of the second embodiment.

Next, a guidance method selection procedure performed by the guidance method selecting unit 213 will be described in detail, referring to FIGS. 23 to 25. FIG. 23 is a flow chart of the guidance method selection procedure of the second embodiment. FIG. 24 illustrates an exemplary guidance information database of the second embodiment. FIG. 25 illustrates an exemplary guidance presentation screen of the second embodiment. The guidance method selection procedure is performed at step S17 of the authentication procedure.

[Step S81] The guidance method selecting unit 213 determines whether or not there exists a registered template corresponding to a user. When there exists a registered template corresponding to a user, the guidance method selecting unit 213 proceeds to step S82, or proceeds to step S83 when there is no registered template.

[Step S82] The guidance method selecting unit 213 selects a registered template as a reference for comparison with the palm image.

[Step S83] The guidance method selecting unit 213 selects a standard model as a reference for comparison with the palm image.

[Step S84] The guidance method selecting unit 213 identifies, from the concavity/convexity information (surface information), inclination/deformation of the palm. The concavity/convexity information to be used for identification may be the concavity/convexity information analyzed by the surface information analysis unit 210, or the concavity/convexity information may be newly analyzed along with identifying the reference for comparison.

[Step S85] The guidance method selecting unit 213 obtains, from a guidance information database 54, guidance information corresponding to the identified inclination/deformation of the palm.

[Step S86] When the guidance method selecting unit 213 successfully obtains, from the guidance information database 54, guidance information corresponding to the identified inclination/deformation of the palm, the guidance method selecting unit 213 proceeds to step S87. When, on the other hand, the guidance method selecting unit 213 failed to obtain, from the guidance information database 54, guidance information corresponding to the identified inclination/deformation of the palm, the guidance method selecting unit 213 proceeds to step S88.

[Step S87] The guidance method selecting unit 213 performs guidance notification according to the guidance information obtained from the guidance information database 54, and terminates the guidance method selection procedure.

[Step S88] The guidance method selecting unit 213 performs notification of guiding the palm to a correct position at which the palm is to be held, and terminates the guidance method selection procedure.

Guidance information 320 is an example of guidance information obtained at step S85. The guidance information 320 is an example of guidance information managed by the guidance information database 54. The guidance information includes information for determining the guidance method, such as identification number, concave state and convex state of each site (site 1, site 2, . . . ), overall state overviewing the plurality of sites as a whole. In addition, the guidance information 320 is information on guidance notification such as state messages corresponding to the overall state, guidance messages, retry messages, or the like.

Identification number refers to the identification information for uniquely specifying guidance information. A combination of the concavity/convex state of each site identifies the overall state. The overall state corresponds to the concavity/convex state for each of one or more sites. State message refers to the message indicating the state of the user's palm. Guidance message refers to the message for guiding the palm to a correct position. Retry message refers to the message indicating the degree of guidance in comparison with the previously captured posture.

Accordingly, the authentication apparatus 20 performs notification such as that on the guidance presentation screen 85. The guidance presentation screen 85 displays image-based guidance presentations 86 and 87, and a message presentation 88 which is a message-based guidance presentation. The guidance presentation 86, which is an image looking at the palm from above, displays the posture of the correct position (standard model) and the posture at the image capturing position in a comparable manner. It suffices that the guidance presentation 86 is useful for grasping the displacement in the horizontal direction, and an image looking at the palm from below may also be used. The guidance presentation 87, which is an image looking at the palm from the side, displays the posture of the correct position and the posture at the image capturing position (estimated from analysis of surface information) in a comparable manner. It suffices that the guidance presentation 87 is useful for grasping the displacement in the vertical direction. Although a captured image may be used for the guidance presentation 86, it may also be CG (Computer Graphic). The guidance presentation 87 may use CG. The guidance presentations 86 and 87 display the contour of the posture at the correct position with a solid line and the contour of the posture at the image capturing position with a dashed line, for ease of comparison.

The message presentation 88 includes a state message 89, a guidance message A90, and a guidance message B91. The state message 89 indicates the posture that caused matching failure, in order to correct the posture of which the user is unaware. For example, the state message 89 indicates that "your finger is slightly bent". The guidance message A90 is a message which alarms the user of the attitude when being photographed, in order to correct the instability of the posture of which the user is unaware. For example, the message A90 provides an instruction such as "please relax". The guidance message B91 is a message which specifically indicates an incorrect posture of the user. For example, the guidance message B91 provides a guidance such as "hold your palm so that the entire palm looks flat when seen from the side". The authentication apparatus 20 may provide audio notification in addition to, or in place of the message presentation 88.

As thus described, since the authentication apparatus 20 provides the user with evaluation of the manner of holding the palm (notification of the state message 89), improvement of the user's learning speed of how to hold the palm may be expected to be enhanced. In addition, since the authentication apparatus 20 alarms the user of the attitude when being photographed (notification of the guidance message A 90), instability of the posture of which the user is unaware is expected to be corrected. In addition, since the authentication apparatus 20 specifically indicates an incorrect posture of the user (notification of the guidance presentation 86, the guidance presentation 87, and the guidance message B 91), the user is expected to appropriately correct the posture.

In addition, the authentication apparatus 20 need not access the registered template when performing guidance notifications in comparison with the standard model. Accordingly, the authentication apparatus 20 is also able to apply guidance notification when performing preliminary matching with the standard model prior to matching using the registered template.

Next, a more specific description will be provided using a third embodiment.

Third Embodiment

Figure 26:
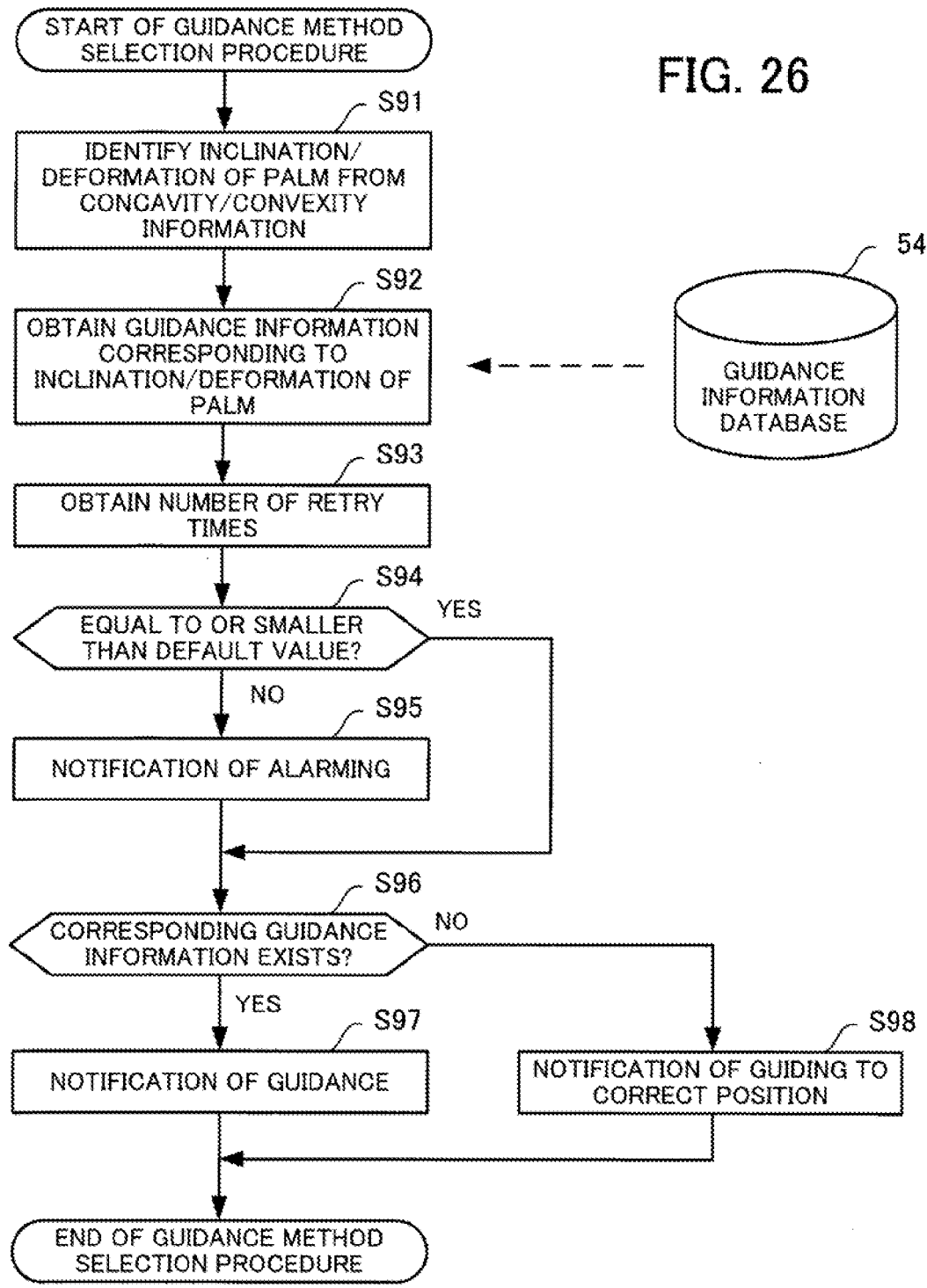
FIG. 26 is a flow chart of a guidance method selection procedure of a third embodiment.

FIG. 26 is a flow chart of a guidance method selection procedure of the third embodiment. The guidance method selection procedure of the third embodiment is different from that of the second embodiment in that guidance notification is performed according to the number of retry times.

[Step S91] The guidance method selecting unit 213 identifies inclination/deformation of the palm from the concavity/convexity information (surface information) analyzed by the surface information analysis unit 210.

[Step S92] The guidance method selecting unit 213 obtains, from the guidance information database 54, guidance information corresponding to the identified inclination/deformation of the palm.

[Step S93] The guidance method selecting unit 213 obtains the accumulated number of times the retry flag is set (number of retry times).

[Step S94] The guidance method selecting unit 213 determines whether or not the number of retry times is equal to or smaller than a predetermined default value. When the number of retry times is equal to or smaller than the default value, the guidance method selecting unit 213 proceeds to step S96, or proceeds to step S95 when the default value is exceeded.

[Step S95] The guidance method selecting unit 213 identifies, from a plurality of causes of failure, a particular cause of failure occurring with a significant frequency, and performs notification for alarming as to the cause of failure occurring with a significant frequency.

[Step S96] When the guidance method selecting unit 213 successfully obtains guidance information corresponding to the identified inclination/deformation of the palm from the guidance information database 54, the guidance method selecting unit 213 proceeds to step S97. When, on the other hand, the guidance method selecting unit 213 failed to obtain guidance information corresponding to the identified inclination/deformation of the palm from the guidance information database 54, the guidance method selecting unit 213 proceeds to step S98.

[Step S97] The guidance method selecting unit 213 performs guidance notification according to the guidance information obtained from the guidance information database 54, and terminates the guidance method selection procedure.

[Step S98] The guidance method selecting unit 213 performs notification of guiding the correct position at which the palm is to be held, and terminates the guidance method selection procedure.

Accordingly, the authentication apparatus 20 is able to appropriately indicate the trend of failures made by the user, as well as the cause of the last failure.

Fourth Embodiment

Next, a fourth embodiment will be described, referring to FIGS. 27, 28, 29, 30A to 30F, 31A and 31B. The authentication apparatus of the fourth embodiment is different from that of the second embodiment in that the surface information of the captured image may be corrected without preliminarily performing extraction and analysis of the surface information.

Figure 27:
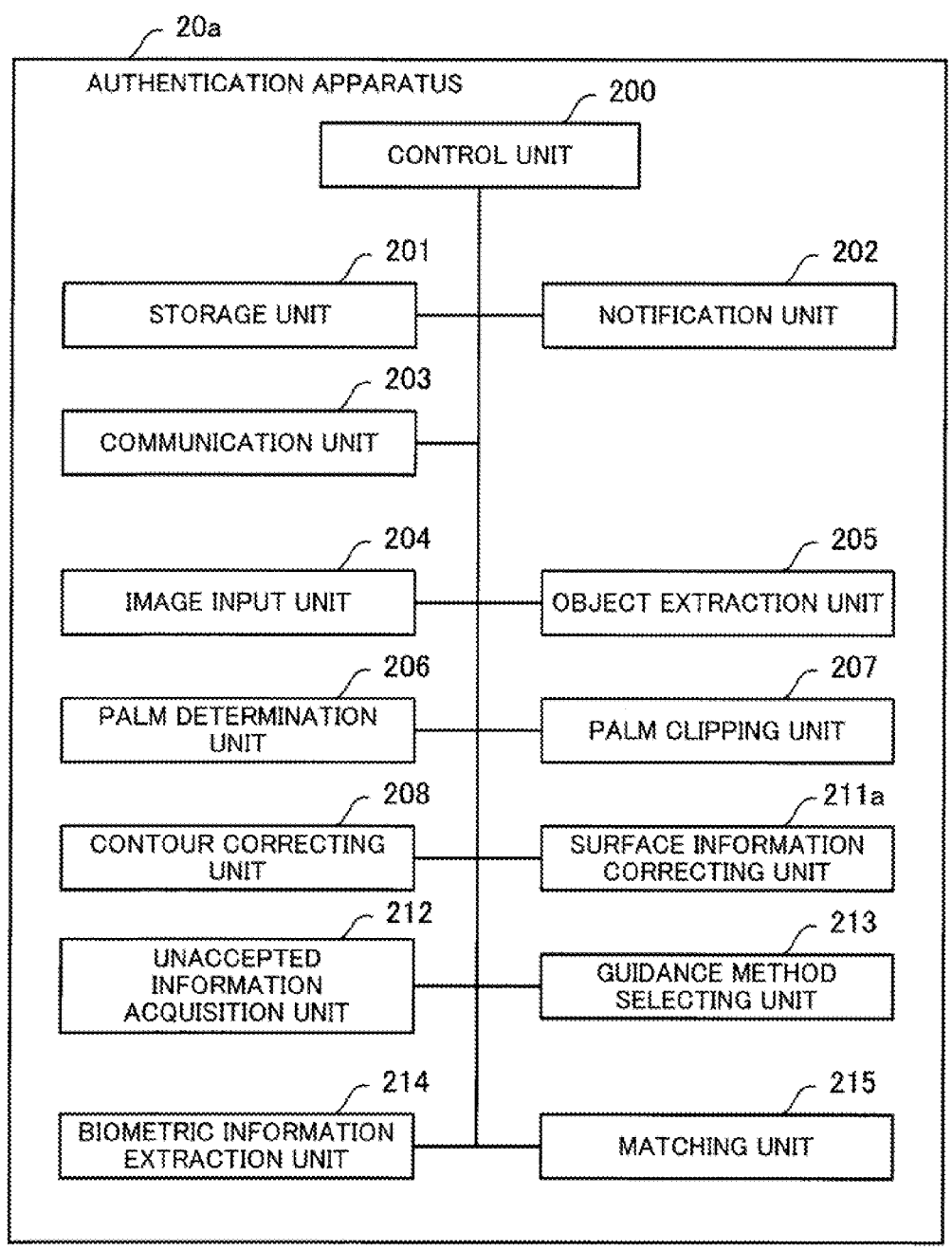
FIG. 27 illustrates a configuration of an authentication apparatus of a fourth embodiment.

First, a configuration of an authentication apparatus 20a for performing a procedure of palm vein authentication will be described, referring to FIG. 27. FIG. 27 illustrates a configuration of an authentication apparatus of the fourth embodiment. Components similar to those of the authentication apparatus 20 of the second embodiment are provided with identical reference numerals with description thereof being omitted.

The authentication apparatus 20a has the control unit 200, the storage unit 201, the notification unit 202, the communication unit 203, the image input unit 204, the object extraction unit 205, the palm determination unit 206, the palm clipping unit 207, and the contour correcting unit 208. Furthermore, the authentication apparatus 20a includes a surface information correcting unit 211a, the unaccepted information acquisition unit 212, the guidance method selecting unit 213, the biometric information extraction unit 214, and the matching unit 215.

The surface information correcting unit 211a performs correction to remove surface-reflected light and high-frequency components from the palm image corrected by the contour correcting unit 208. When correction by the contour correcting unit 208 is not needed, the surface information correcting unit 211a may perform correction to remove surface-reflected light and high-frequency components from the captured image of the palm.

Figure 28:
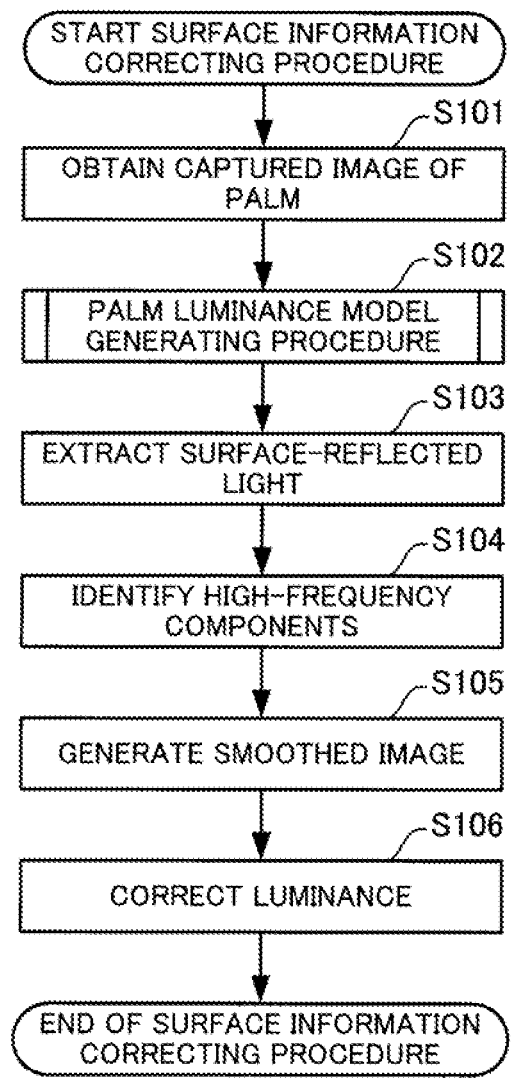
FIG. 28 is a flow chart of a surface information correcting procedure of the fourth embodiment.
Figure 29:
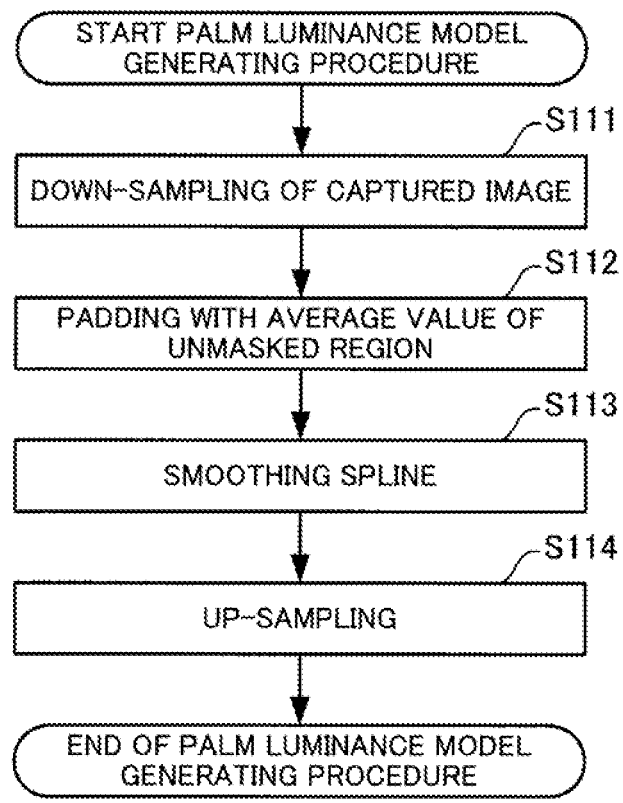
FIG. 29 is a flow chart of a palm luminance model generating procedure of the fourth embodiment.
Figure 30A:
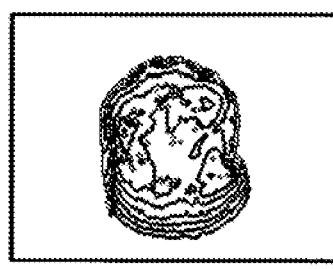
FIGS. 30A to 30F illustrate an example of surface information correcting procedure of the fourth embodiment.
Figure 30B:
Figure 30C:
Figure 30D:
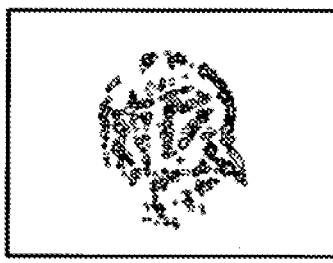
Figure 30E:
Figure 30F:
Figure 31A:
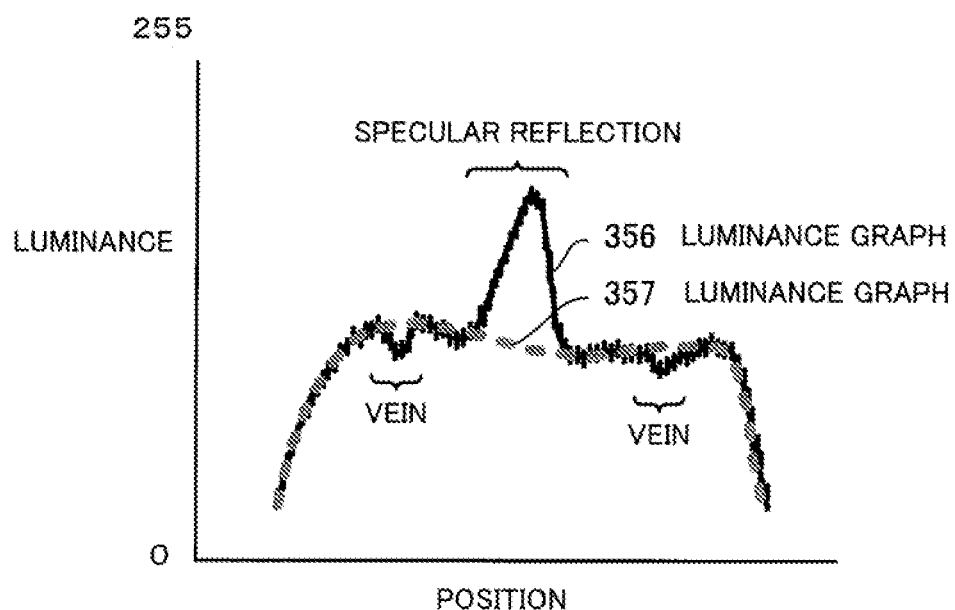
FIGS. 31A and 31B illustrate luminance graphs of the fourth embodiment, as well as states of the luminance corrected image in which surface reflection and high frequencies are removed from the luminance graph.
Figure 31B:
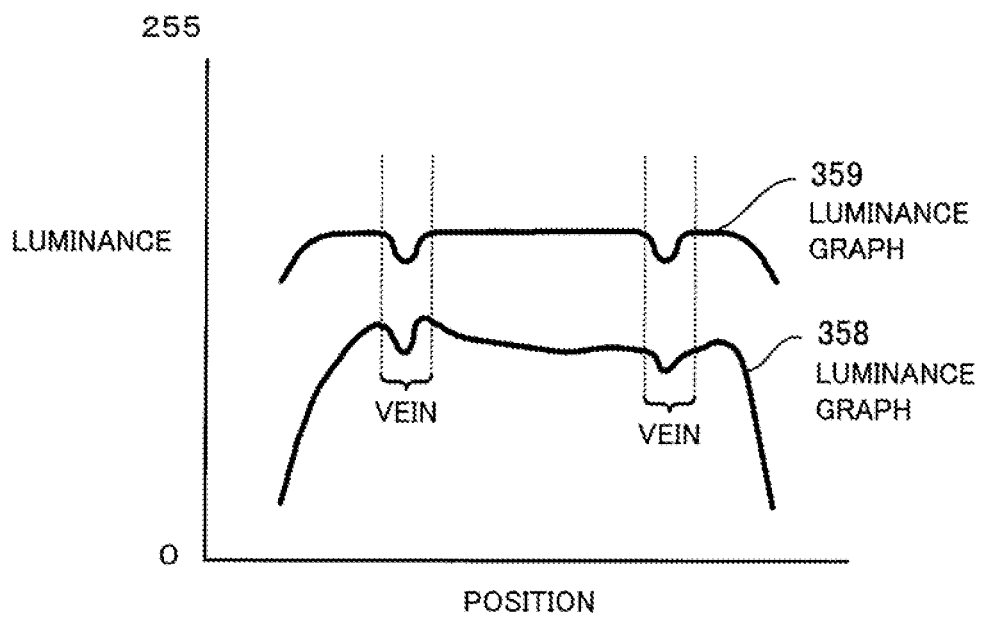

Next, a surface information correcting procedure performed by the surface information correcting unit 211a will be described, referring to FIGS. 28, 29, 30A to 30F, 31A and 31B. FIG. 28 is a flow chart of the surface information correcting procedure of the fourth embodiment. FIG. 29 is a flow chart of a palm luminance model generating procedure of the fourth embodiment. FIGS. 30A to 30F illustrate examples of the surface information correcting procedure of the fourth embodiment. FIGS. 31A and 31B illustrate luminance graphs of the fourth embodiment, as well as a state of the luminance corrected image with surface reflection and high frequencies having been removed from the luminance graph.

[Step S101] The surface information correcting unit 211a obtains a captured image of a palm (e.g., palm image 350). The palm image 350 is an image of a palm captured by near infrared irradiation. The palm image 350 is a gray scale image having 256 gradations from 0 to 255, for example. FIGS. 30A to 30F schematically illustrate the gray scale image having 256 gradations (luminance distribution) using lines dividing between predetermined gradations. The luminance distribution illustrated in FIGS. 30A to 30F is dark in the background and bright in the part of the palm.

[Step S102] The surface information correcting unit 211a performs a palm luminance model generating procedure which generates a luminance model of a palm (e.g., luminance model 351) from a captured image of a palm (e.g., palm image 350). Details of the palm luminance model generating procedure will be described later.

[Step S103] The surface information correcting unit 211a extracts surface-reflected light (e.g., surface-reflected light 352) from the captured image of the palm (e.g., palm image 350) and the luminance model (e.g., luminance model 351). The surface-reflected light may be extracted from the difference between the captured image of the palm and the luminance model. Specifically, surface-reflected light may be extracted by obtaining the maximum value of the luminance of the captured image of the palm and the luminance of the luminance model for each pixel, and subtracting the luminance of the luminance model from the maximum value. The surface-reflected light includes specular-reflected light, i.e., light from the light source (including outside light and the like, without being limited to light sources irradiating the palm at the time of image-capturing of the palm) specularly reflected on the palm.

[Step S104] The surface information correcting unit 211a identifies high-frequency components (e.g., high-frequency component 353) included in surface-reflected light (e.g., surface-reflected light 352). The high-frequency components mentioned here refers to frequency components that are higher than the frequency component associated with the biometric information (vein of a palm) used for biometric authentication. High-frequency components are noise components appearing from sensitivity characteristics inherent, for example, to the imaging device that performed image-capturing (imaging) of the palm, the peripheral environment, or the like.

The surface information correcting unit 211a may specify high-frequency components by a Top-hat by Reconstruction procedure based on an Opening procedure using a Structuring Element, which is a kind of Gray-Scale Morphology procedure. Particularly, the surface information correcting unit 211a may identify high-frequency components from the result of processing by selecting a structure element having a high correlation with the high-frequency components.

[Step S105] The surface information correcting unit 211a removes surface-reflected light (e.g., surface-reflected light 352) and high-frequency components (e.g., high-frequency component 353) from the captured image of the palm (e.g., palm image 350). The surface information correcting unit 211a further generates a smoothed image (e.g., smoothed image 354) in which steep changes are smoothed based on the luminance model (e.g., luminance model 351).

Removal of surface-reflected light and high-frequency components of the captured image of the palm is not limited to both the removal of surface-reflected light and the removal of high-frequency components, but either one of which may be performed. In addition, removal of surface-reflected light and high-frequency components of the captured image of the palm may be performed only for a predetermined ratio without being limited to removal of the whole. In addition, the ratio of surface-reflected light and high-frequency components to be removed from the captured image of the palm may be determined individually for the removal of surface-reflected light from the captured image of the palm, and the removal of high-frequency components from the captured image of the palm. In addition, the ratio of surface-reflected light and high-frequency components to be removed from the captured image of the palm may be preliminarily set, or may be set according to a predetermined condition (e.g., for each type of each unit of image sensor provided in the authentication apparatus).

[Step S106] The surface information correcting unit 211a generates a luminance corrected image (e.g., luminance corrected image 355) having uniformized the surface luminance of the smoothed image (e.g., smoothed image 354), and terminates the surface information correcting procedure. The surface information correcting unit 211a smooths the steep change of luminance in the smoothed image, and uniformizes the surface luminance of the smoothed image based on the luminance model, in order to facilitate extraction of biometric information. For example, uniformization of surface luminance of the smoothed image may be performed by reducing the luminance by a predetermined amount or a predetermined ratio, based on the difference between the luminance model and the smoothed image.

Next, a palm luminance model generating procedure performed at step S102 of the surface information correcting procedure will be described. The luminance model generating procedure is performed by the surface information correcting unit 211a.

[Step S111] The surface information correcting unit 211a reduces the amount of information of the captured image by performing sampling of the captured image of the palm with a lowered sampling frequency (down-sampling). In other words, the surface information correcting unit 211a generates a first converted image from the captured image of the palm. The sampling frequency may be preliminarily set, or may be determined according to frequency components included in the captured image.

[Step S112] The surface information correcting unit 211a masks the palm part of the first converted image, and fills (padding) an unmasked region which is not a part of the palm (background part) with the average value of luminance of the unmasked region. In other words, the surface information correcting unit 211a generates a second converted image from the first converted image.

[Step S113] The surface information correcting unit 211a removes, from the second converted image, the steep change of luminance by smoothing (smoothing spline) based on a spline function. In other words, the surface information correcting unit 211a generates a third converted image from the second converted image.

[Step S114] The surface information correcting unit 211a increases the amount of information of the third converted image to generate a luminance model by performing sampling of the third converted image with an increased sampling frequency (up-sampling). In other words, the surface information correcting unit 211a generates a luminance model (fourth converted image) from the third converted image.

Accordingly, the surface information correcting unit 211a may generate a luminance model of the palm from the captured image of the palm. The surface information correcting unit 211a then may remove surface-reflected light and high-frequency components from the captured image of the palm. Furthermore, the surface information correcting unit 211a may generate a luminance corrected image having uniformized the surface luminance of the image (smoothed image) having surface-reflected light and high-frequency components removed therefrom.

Generation of the luminance corrected image from the captured image of the palm thus performed by the surface information correcting unit 211a will be described using graphs illustrated in FIGS. 31A and 31B. The graphs illustrated in FIGS. 31A and 31B are graphs when the captured image of the palm is scanned in the lateral direction, with the x-axis representing the position of the lateral direction of the palm and the y-axis representing the luminance.

The surface information correcting unit 211a obtains a captured image representing a luminance distribution such as that of the luminance graph 356. The luminance graph 356 is a graph schematically representing the luminance distribution when the palm image 350 is scanned in the lateral direction. The luminance graph 356 indicates that the luminance increases along the contour of the palm, with the luminance being lower in the background part. In addition, the luminance graph 356 includes a part where the luminance steeply changes due to specular reflection (specular reflection part), a vein part where the luminance is lower than the periphery, and a high-frequency component which becomes noise.

The surface information correcting unit 211a obtains a luminance model representing the luminance distribution such as that of the luminance graph 357, by performing the palm model generating procedure from the luminance graph 356 (FIG. 31A). The luminance graph 357 is a graph schematically representing the luminance distribution when the luminance model 351 is scanned in the lateral direction. The luminance graph 357 has the specular reflection part, the vein part, and the high-frequency component removed therefrom, which exist in the luminance graph 356.

The surface-reflected light removed by the surface information correcting unit 211a is a specular reflection part in the luminance graph 356, corresponding to the surface-reflected light 352, for example. The vein removed by the surface information correcting unit 211a is the vein part in the luminance graph 356. The high-frequency component removed by the surface information correcting unit 211a corresponds to the high-frequency component 353, for example.

The surface information correcting unit 211a obtains a smoothed image representing a luminance distribution such as that of the luminance graph 358 by removing surface-reflected light and high-frequency components from the luminance graph 356 and smoothing the steep change based on the luminance model (FIG. 31B). The luminance graph 358 is a graph schematically representing the luminance distribution when the smoothed image 354 is scanned in the lateral direction. The luminance graph 358 has the specular reflection part and high-frequency components removed therefrom, which exist in the luminance graph 356.

The surface information correcting unit 211a uniformizes the surface luminance of the luminance graph 358, and obtains a luminance corrected image representing a luminance distribution such as that of the luminance graph 359 (FIG. 31B). The luminance graph 359 is a graph schematically representing the luminance distribution when the luminance corrected image 355 is scanned in the lateral direction. In the luminance graph 359, the gradient of the luminance existing in the luminance graph 358 is uniformized.

In this manner, the authentication apparatus 20a is able to obtain the luminance corrected image, facilitating extraction of biometric information. In addition, the authentication apparatus 20a is able to extend the tolerance of the posture of the living body, since extraction of biometric information is facilitated. In addition, the authentication apparatus 20a is able to identify surface-reflected light using only gray scale images as the input, and thus it is possible to realize a higher processing speed than when performing identification of surface-reflected light using color images.

Although it is common to use a low pass filter to remove high-frequency components, a low pass filter, which works on the entire input image, is not suitable for removing local high-frequency components. On the other hand, the authentication apparatus 20a is able to successfully remove high-frequency components included in surface-reflected light.

The noise of high-frequency components may be due to the sensitivity characteristics inherent to the imaging device. For example, the authentication system 10 illustrated in FIG. 2 has the authentication apparatus 20, the authentication apparatus 30, and the authentication apparatus 40, each apparatus being provided with an imaging device for photographing the living body and naturally having inherent sensitivity characteristics. Alternatively, for example, there may be a case where different imaging devices are used such that the authentication apparatus 20 has a CMOS image sensor as an imaging device and the authentication apparatus 30 has a CCD image sensor as an imaging device.

Also in such case, the authentication apparatus 20a is able to remove noise due to sensitivity characteristics inherent to the imaging device and extract stable biometric information (vein characteristics). Accordingly, the authentication apparatus 20a is able to maintain a high authentication precision even when different authentication apparatuses are used for registering and matching biometric information. The authentication system configured to include the authentication apparatus 20a is able to improve compatibility and interoperability between different authentication apparatuses.

The processing function described above may be realized using a computer. In such a case, a program is provided containing description of the functions supposed to be realized by the authentication apparatus 20, the authentication apparatus 30, the authentication apparatus 40, the authentication server 50, and the authentication apparatus 20a. Executing the program by a computer realizes the above-mentioned processing functions on the computer. The program containing description of the procedure may be stored in computer-readable recording media (including portable recording media). As computer-readable recording media, there are magnetic recording apparatus, optical disks, magneto-optical recording media, semiconductor memories, and the like. As magnetic recording apparatuses, there are Hard Disk Drives (HDD), flexible disks (FD), magnetic tapes, and the like. As optical disks, there are DVD (Digital Versatile Disc), DVD-RAM, CD-ROM, CD-R (Recordable)/RW (Re-Writable), and the like. As magneto-optical recording media, there are MO (Magneto-Optical disk) and the like.

When distributing a program, portable recording media such as DVD or CD-ROM having the program stored thereon are sold, for example. Alternatively, a program may be stored in a storage unit of a server computer, and transferred from the server computer to other computers via a network.

A computer supposed to execute a program stores the program stored in a portable storage medium or transferred from the server computer in its own storage unit. The computer then reads the program from its own storage unit and performs a procedure according to the program. The computer is also able to directly read the program from the portable storage medium and perform a procedure according to the program. In addition, the computer is also able to sequentially perform, each time a program is transferred from the server computer, a procedure according to the program received.

Although a palm is exemplified as the living body surface in the embodiment described above, it is not limiting, and any part may be used as long as it is a living body surface.

For example, the living body surface may be a sole, a finger of a hand or a foot, a dorsum of a hand or a foot, a wrist, an arm, or the like.

When using a vein for authentication, it suffices that the living body surface is a part where the vein is observable.

A living body surface allowing identification of a biometric information acquisition site is advantageous for authentication. For example, a palm or a face allows identification of a site from the obtained image.

Biometric information used for authentication is not limited to a vein and may be a fingerprint, a palm print, or the like.

According to the authentication apparatus, the authentication program, and the authentication method described above, the tolerance of posture of the living body may be extended.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An authentication apparatus, comprising:
    one or more processors configured to perform a procedure including:
    correcting surface information on a living body surface extracted from image information obtained by photographing a living body; and
    performing biometric authentication using the corrected surface information,
    wherein the correcting the surface information includes:
        generating a luminance model of the living body from a luminance distribution of the image information,
        extracting surface-reflected light of the living body from the luminance model,
        identifying high-frequency components included in the surface-reflected light and higher than a frequency component of biometric information used for the biometric authentication, and
        removing, from the image information, at least a part of the surface-reflected light and the high-frequency components to generate a smoothed image in which steep changes are smoothed,
    wherein the surface information allows concavity/convexity of the living body surface to be evaluated,
    wherein the one or more processors further perform a procedure including:
    extracting, from the image information, luminance information as the surface information that allows the concavity/convexity of the living body surface to be evaluated; and
    identifying, from the surface information, a range and brightness of a concave/convex part of the living body surface to determine whether or not the range and a degree of the brightness of the concave/convex part of the living body surface are within a correctable predetermined range, and
    wherein the correcting the surface information is performed by correcting the concavity/convexity of the living body surface for the surface information.

2. The authentication apparatus according to claim 1, wherein the analyzing the surface information is performed by dividing the living body surface into a plurality of subregions to identify a range and brightness of a concave/convex part for each of the subregions.

3. The authentication apparatus according to claim 2, wherein the subregions are arranged allowing existence of mutually overlapping regions.

4. The authentication apparatus according to claim 3, wherein the correcting the surface information is performed by correcting brightness of the surface information for each site.

5. The authentication apparatus according to claim 1, wherein notification of guiding the living body to a correct position is performed, in order to re-obtain image information when the image information is uncorrectable.

6. The authentication apparatus according to claim 5, wherein the notification performs notification of a message indicating evaluation of the posture of the living body from the uncorrectable image information.

7. The authentication apparatus according to claim 1, wherein the uncorrectable image information is obtained as unaccepted biometric information.

8. The authentication apparatus according to claim 7, wherein the obtaining the unaccepted biometric information obtains, as unaccepted environment information, information on an environment in which the uncorrectable image information has been captured.

9. A non-transitory computer-readable storage medium storing an authentication program, the authentication program causing a computer to perform personal authentication using characteristics of a living body, the authentication program causing the computer to perform a procedure comprising:
    correcting surface information on a living body surface extracted from image information obtained by photographing the living body; and
    performing biometric authentication using the corrected surface information,
    wherein the correcting the surface information includes:
        generating a luminance model of the living body from a luminance distribution of the image information,
        extracting surface-reflected light of the living body from the luminance model, identifying high-frequency components included in the surface-reflected light and higher than a frequency component of biometric information used for the biometric authentication, and
        removing, from the image information, at least a part of the surface-reflected light and the high-frequency components to generate a smoothed image in which steep changes are smoothed,
    wherein the surface information allows concavity/convexity of the living body surface to be evaluated,
    wherein the procedure further comprises:
    extracting, from the image information, luminance information as the surface information that allows the concavity/convexity of the living body surface to be evaluated; and
    identifying, from the surface information, a range and brightness of a concave/convex part of the living body surface to determine whether or not the range and a degree of the brightness of the concave/convex part of the living body surface are within a correctable predetermined range, and wherein the correcting the surface information is performed by correcting the concavity/convexity of the living body surface for the surface information.

10. An authentication method of performing personal authentication using characteristics of a living body, comprising:

correcting, by a processor, surface information on a living body surface extracted from image information obtained by photographing the living body; and performing, by the processor, biometric authentication using the corrected surface information, wherein the correcting the surface information includes:
generating a luminance model of the living body from a luminance distribution of the image information,
extracting surface-reflected light of the living body from the luminance model,
identifying high-frequency components included in the surface-reflected light and higher than a frequency component of biometric information used for the biometric authentication, and
removing, from the image information, at least a part of the surface-reflected light and the high-frequency components to generate a smoothed image in which steep changes are smoothed, wherein the surface information allows concavity/convexity of the living body surface to be evaluated, and wherein the method further comprises:

extracting, by the processor, from the image information, luminance information as the surface information that allows the concavity/convexity of the living body surface to be evaluated; and identifying, by the processor, from the surface information, a range and brightness of a concave/convex part of the living body surface to determine whether or not the range and a degree of the brightness of the concave/convex part of the living body surface are within a correctable predetermined range, and wherein the correcting the surface information is performed by correcting the concavity/convexity of the living body surface for the surface information.

* * * * *